(12) United States Patent
Gounares

(10) Patent No.: US 9,734,040 B2
(45) Date of Patent: Aug. 15, 2017

(54) ANIMATED HIGHLIGHTS IN A GRAPH REPRESENTING AN APPLICATION

(71) Applicant: Microsoft Technology Licensing, LLC, Redmond, WA (US)

(72) Inventor: Alexander G. Gounares, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/899,504

(22) Filed: May 21, 2013

(65) Prior Publication Data

US 2014/0189651 A1    Jul. 3, 2014

(51) Int. Cl.
*G06F 9/44*   (2006.01)
*G06F 11/36*  (2006.01)

(52) U.S. Cl.
CPC ...... *G06F 11/3664* (2013.01); *G06F 11/3636* (2013.01)

(58) Field of Classification Search
CPC .................................................. G06F 9/44
USPC ....... 717/124, 125, 128, 129, 130, 131, 132, 717/134, 126, 127
See application file for complete search history.

(56) References Cited

U.S. PATENT DOCUMENTS

| | | | |
|---|---|---|---|
| 5,327,568 A | 7/1994 | Maejima et al. | |
| 5,642,511 A * | 6/1997 | Chow et al. | 717/105 |
| 5,732,277 A | 3/1998 | Kodosky et al. | |
| 5,740,440 A | 4/1998 | West | |
| 5,758,183 A | 5/1998 | Scales | |
| 5,778,004 A | 7/1998 | Jennion et al. | |
| 5,835,085 A * | 11/1998 | Eick et al. | 715/853 |
| 5,852,449 A * | 12/1998 | Esslinger et al. | 345/473 |
| 5,946,488 A | 8/1999 | Tanguay et al. | |
| 5,999,192 A * | 12/1999 | Selfridge et al. | 345/440 |
| 6,003,143 A | 12/1999 | Kim et al. | |
| 6,026,362 A | 2/2000 | Kim et al. | |

(Continued)

FOREIGN PATENT DOCUMENTS

| | | |
|---|---|---|
| CN | 101627388 | 1/2010 |
| CN | 102592079 | 7/2012 |

(Continued)

OTHER PUBLICATIONS

LabVIEW ("Debugging Techniques"), Jun. 2011.*

(Continued)

*Primary Examiner* — Jae Jeon
(74) *Attorney, Agent, or Firm* — Workman Nydegger

(57) ABSTRACT

Highlighted objects may traverse a graph representing an application's code elements and relationships between those code elements. The highlighted objects may be animated to represent how the objects are processed in an application. The graph may represent code elements and relationships between the code elements, and the highlighting may be generated by tracing the application to determine the flow of the object through code elements and across relationships. A user may control the highlighted graph with a set of playback controls for playing through the sequence of highlights on the graph. The playback controls may include pause, rewind, forward, fast forward, and other controls. The controls may also include a step control which may step through small time increments.

23 Claims, 12 Drawing Sheets

(56) References Cited

U.S. PATENT DOCUMENTS

| | | |
|---|---|---|
| 6,038,395 A * | 3/2000 | Chow et al. ............... 717/105 |
| 6,108,340 A | 8/2000 | Rolfe |
| 6,202,199 B1 | 3/2001 | Wygodny et al. |
| 6,219,826 B1 | 4/2001 | De Pauw et al. |
| 6,226,787 B1 * | 5/2001 | Serra ............... G06F 11/3664 |
| | | 714/E11.217 |
| 6,243,857 B1 | 6/2001 | Logan et al. |
| 6,266,804 B1 | 7/2001 | Isman |
| 6,282,701 B1 | 8/2001 | Wygodny et al. |
| 6,374,271 B1 | 4/2002 | Shimizu |
| 6,681,384 B1 | 1/2004 | Bates et al. |
| 6,742,003 B2 | 5/2004 | Heckerman et al. |
| 6,748,585 B2 | 6/2004 | Proebsting |
| 6,775,423 B2 | 8/2004 | Kulkarni |
| 6,792,460 B2 | 9/2004 | Oulu |
| 6,792,595 B1 | 9/2004 | Storistenau et al. |
| 6,862,727 B2 | 3/2005 | Stevens |
| 6,938,186 B2 | 8/2005 | Das et al. |
| 7,058,928 B2 | 6/2006 | Wygodny et al. |
| 7,093,234 B2 | 8/2006 | Hibbeler et al. |
| 7,120,901 B2 | 10/2006 | Ferri et al. |
| 7,174,536 B1 | 2/2007 | Kothari et al. |
| 7,194,664 B1 | 3/2007 | Fung et al. |
| 7,203,925 B1 | 4/2007 | Michael et al. |
| 7,219,300 B2 | 5/2007 | Arquie |
| 7,386,839 B1 | 6/2008 | Golender et al. |
| 7,468,727 B2 | 12/2008 | Wong |
| 7,472,378 B2 | 12/2008 | Bennett |
| 7,509,343 B1 | 3/2009 | Washburn |
| 7,543,281 B2 | 6/2009 | King et al. |
| 7,574,675 B1 | 8/2009 | Linker |
| 7,607,169 B1 | 10/2009 | Njemanze et al. |
| 7,620,947 B2 | 11/2009 | Krishnaswamy |
| 7,624,380 B2 | 11/2009 | Okada |
| 7,639,256 B1 | 12/2009 | Yablonski |
| 7,650,574 B2 | 1/2010 | Nattinger |
| 7,657,873 B2 | 2/2010 | Horton et al. |
| 7,681,182 B1 | 3/2010 | Mistry et al. |
| 7,788,640 B2 | 8/2010 | Grimaldi |
| 7,814,453 B2 | 10/2010 | Stevens et al. |
| 7,827,539 B1 | 11/2010 | Wygodny et al. |
| 7,853,930 B2 | 12/2010 | Mitchell et al. |
| 7,865,872 B2 | 1/2011 | Chamieh et al. |
| 8,024,708 B2 | 9/2011 | Demetriou |
| 8,032,866 B1 | 10/2011 | Golender et al. |
| 8,056,059 B2 | 11/2011 | Chockler |
| 8,069,145 B2 | 11/2011 | Surtani |
| 8,286,142 B2 | 10/2012 | Fjeldstad et al. |
| 8,312,056 B1 | 11/2012 | Peng et al. |
| 8,312,435 B2 | 11/2012 | Wygodny et al. |
| 8,316,354 B2 | 11/2012 | Vanrenen |
| 8,359,584 B2 | 1/2013 | Rao et al. |
| 8,381,178 B2 | 2/2013 | Martino et al. |
| 8,406,565 B1 * | 3/2013 | Schildan ............... G06K 9/00973 |
| | | 345/634 |
| 8,490,055 B2 | 7/2013 | Basak |
| 8,495,598 B2 | 7/2013 | Gounares et al. |
| 8,516,443 B2 | 8/2013 | Li |
| 8,543,983 B2 | 9/2013 | Murthy |
| 8,572,575 B2 | 10/2013 | Berlyant et al. |
| 8,595,743 B2 | 11/2013 | Gounares et al. |
| 8,607,018 B2 | 12/2013 | Gounares et al. |
| 8,615,766 B2 | 12/2013 | Gounares et al. |
| 8,640,100 B2 | 1/2014 | Neumann et al. |
| 8,640,104 B2 | 1/2014 | McEntee |
| 8,650,538 B2 | 2/2014 | Gounares et al. |
| 8,656,134 B2 | 2/2014 | Gounares et al. |
| 8,656,135 B2 | 2/2014 | Gounares et al. |
| 8,656,359 B2 | 2/2014 | Savov |
| 8,656,378 B2 | 2/2014 | Gounares et al. |
| 8,681,155 B2 | 3/2014 | Basak |
| 8,694,574 B2 | 4/2014 | Gounares et al. |
| 8,700,838 B2 | 4/2014 | Gounares et al. |
| 8,707,326 B2 | 4/2014 | Garrett |
| 8,713,064 B1 | 4/2014 | Khafizov |
| 8,726,255 B2 | 5/2014 | Gounares et al. |
| 8,745,591 B2 | 6/2014 | De Smet et al. |
| 8,745,594 B1 | 6/2014 | Iossiphidis |
| 8,752,021 B2 | 6/2014 | Li et al. |
| 8,752,034 B2 | 6/2014 | Gounares et al. |
| 8,756,581 B2 | 6/2014 | Castanos et al. |
| 8,793,656 B2 | 7/2014 | Huang |
| 8,943,441 B1 | 1/2015 | Patrick |
| 8,966,452 B2 | 2/2015 | Gataullin et al. |
| 8,990,777 B2 | 3/2015 | Gounares |
| 8,997,056 B2 | 3/2015 | Li et al. |
| 9,256,969 B2 | 2/2016 | Krajec |
| 9,280,841 B2 | 3/2016 | Krajec |
| 9,292,415 B2 | 3/2016 | Seto et al. |
| 9,298,588 B2 | 3/2016 | Seto et al. |
| 9,298,589 B2 | 3/2016 | Gautallin et al. |
| 9,311,213 B2 | 4/2016 | Seto et al. |
| 9,323,863 B2 | 4/2016 | Krajec |
| 9,437,024 B2 | 9/2016 | Krajec |
| 2001/0034859 A1 | 10/2001 | Swoboda |
| 2002/0007297 A1 | 1/2002 | Clarke |
| 2002/0073063 A1 | 6/2002 | Faraj |
| 2002/0085041 A1 | 7/2002 | Ishikawa |
| 2002/0087949 A1 | 7/2002 | Golender |
| 2002/0138788 A1 | 9/2002 | Yenne et al. |
| 2002/0157086 A1 | 10/2002 | Lewis et al. |
| 2002/0163498 A1 | 11/2002 | Chang et al. |
| 2002/0178185 A1 * | 11/2002 | Kuchinsky et al. .......... 707/512 |
| 2002/0196229 A1 | 12/2002 | Chen et al. |
| 2002/0199172 A1 | 12/2002 | Bunnell |
| 2003/0037248 A1 * | 2/2003 | Launchbury et al. ........ 713/193 |
| 2003/0061574 A1 | 3/2003 | Saluja et al. |
| 2003/0067481 A1 * | 4/2003 | Chedgey et al. ............. 345/738 |
| 2003/0088854 A1 | 5/2003 | Wygodny et al. |
| 2003/0106046 A1 | 6/2003 | Arnold |
| 2003/0140280 A1 | 7/2003 | Kaler et al. |
| 2004/0012638 A1 | 1/2004 | Donnelli et al. |
| 2004/0015929 A1 | 1/2004 | Lewis et al. |
| 2004/0073529 A1 | 4/2004 | Stanfill |
| 2004/0083425 A1 | 4/2004 | Dorwart |
| 2004/0117172 A1 | 6/2004 | Shibata |
| 2004/0117768 A1 | 6/2004 | Chang et al. |
| 2004/0128093 A1 * | 7/2004 | Cragun ............... G06Q 10/109 |
| | | 702/79 |
| 2004/0154016 A1 | 8/2004 | Randall |
| 2004/0181554 A1 | 9/2004 | Heckerman et al. |
| 2004/0205302 A1 | 10/2004 | Cantrill |
| 2005/0021318 A1 * | 1/2005 | Inoue ............... G06K 9/00201 |
| | | 703/2 |
| 2005/0102636 A1 | 5/2005 | McKeon |
| 2005/0120333 A1 | 6/2005 | Inoue et al. |
| 2005/0177820 A1 | 8/2005 | Mei et al. |
| 2005/0180330 A1 | 8/2005 | Shapiro |
| 2005/0188272 A1 | 8/2005 | Bodorin et al. |
| 2005/0204344 A1 * | 9/2005 | Shinomi ............... G06F 8/316 |
| | | 717/124 |
| 2005/0262470 A1 | 11/2005 | Gavrilov |
| 2005/0278208 A1 | 12/2005 | Schultz |
| 2006/0015612 A1 | 1/2006 | Shimazaki et al. |
| 2006/0015850 A1 | 1/2006 | Poole |
| 2006/0075390 A1 | 4/2006 | McAllister |
| 2006/0106843 A1 | 5/2006 | Middelfart et al. |
| 2006/0130016 A1 | 6/2006 | Wagner |
| 2006/0182133 A1 | 8/2006 | Choumaru |
| 2006/0212852 A1 | 9/2006 | Hwang |
| 2006/0242627 A1 | 10/2006 | Wygodny et al. |
| 2006/0248177 A1 | 11/2006 | Dostert et al. |
| 2006/0265397 A1 | 11/2006 | Bryan et al. |
| 2007/0022000 A1 * | 1/2007 | Bodart ............... G06Q 10/10 |
| | | 705/7.38 |
| 2007/0028189 A1 * | 2/2007 | Robbins ............... 715/853 |
| 2007/0050174 A1 | 3/2007 | DeWitt et al. |
| 2007/0060205 A1 | 3/2007 | Kim |
| 2007/0118538 A1 | 5/2007 | Ahern et al. |
| 2007/0118909 A1 | 5/2007 | Hertzog |
| 2007/0140131 A1 | 6/2007 | Malloy et al. |
| 2007/0143795 A1 | 6/2007 | Tran |
| 2007/0198952 A1 | 8/2007 | Pittenger |
| 2008/0049022 A1 | 2/2008 | Sherb et al. |

(56) References Cited

U.S. PATENT DOCUMENTS

| | | |
|---|---|---|
| 2008/0065668 A1 | 3/2008 | Spence et al. |
| 2008/0092121 A1 | 4/2008 | DeRose et al. |
| 2008/0104225 A1 | 5/2008 | Zhang |
| 2008/0104451 A1 | 5/2008 | Blanchard et al. |
| 2008/0104570 A1 | 5/2008 | Chedgey et al. |
| 2008/0120400 A1 | 5/2008 | Keller et al. |
| 2008/0126003 A1 | 5/2008 | Goldstein et al. |
| 2008/0127108 A1 | 5/2008 | Ivanov et al. |
| 2008/0127109 A1 | 5/2008 | Simeon |
| 2008/0127112 A1 | 5/2008 | Kettley et al. |
| 2008/0140985 A1 | 6/2008 | Kitamorn et al. |
| 2008/0155348 A1 | 6/2008 | Ivanov et al. |
| 2008/0155349 A1 | 6/2008 | Ivanov et al. |
| 2008/0163124 A1* | 7/2008 | Bonev ............... G06F 11/3664 715/853 |
| 2008/0168472 A1 | 7/2008 | Wilson |
| 2008/0256233 A1 | 10/2008 | Hall |
| 2008/0256466 A1* | 10/2008 | Salvador ............... G06T 19/00 715/762 |
| 2008/0256518 A1 | 10/2008 | Aoshima et al. |
| 2008/0271038 A1 | 10/2008 | Rolia et al. |
| 2008/0282232 A1 | 11/2008 | Cong et al. |
| 2008/0313502 A1 | 12/2008 | Mcfadden et al. |
| 2009/0037407 A1 | 2/2009 | Yang et al. |
| 2009/0037873 A1 | 2/2009 | Ahadian et al. |
| 2009/0049428 A1 | 2/2009 | Cozmei |
| 2009/0089765 A1 | 4/2009 | Guo et al. |
| 2009/0113399 A1 | 4/2009 | Tzoref et al. |
| 2009/0150874 A1 | 6/2009 | Chung et al. |
| 2009/0157723 A1 | 6/2009 | De Peuter et al. |
| 2009/0271729 A1 | 10/2009 | Killoren |
| 2009/0276288 A1 | 11/2009 | Hlavac et al. |
| 2009/0307630 A1 | 12/2009 | Kawai et al. |
| 2009/0313525 A1 | 12/2009 | Savin et al. |
| 2009/0319996 A1 | 12/2009 | Shafl et al. |
| 2010/0005249 A1 | 1/2010 | Bates |
| 2010/0011341 A1 | 1/2010 | Baierl et al. |
| 2010/0042944 A1 | 2/2010 | Robinson et al. |
| 2010/0070505 A1* | 3/2010 | Kao et al. .................. 707/740 |
| 2010/0077388 A1 | 3/2010 | Kimura |
| 2010/0083178 A1 | 4/2010 | Zui et al. |
| 2010/0083185 A1 | 4/2010 | Sakai |
| 2010/0088665 A1* | 4/2010 | Langworthy et al. ........ 717/104 |
| 2010/0134501 A1 | 6/2010 | Lowe |
| 2010/0138431 A1 | 6/2010 | Bator et al. |
| 2010/0153786 A1 | 6/2010 | Matsukawa |
| 2010/0167256 A1 | 7/2010 | Blash |
| 2010/0180245 A1 | 7/2010 | Rutten |
| 2010/0223581 A1 | 9/2010 | Manolescu et al. |
| 2010/0235771 A1 | 9/2010 | Gregg, III |
| 2010/0281468 A1 | 11/2010 | Pavlyushchik |
| 2010/0281488 A1 | 11/2010 | Krishnamurthy et al. |
| 2010/0295856 A1 | 11/2010 | Ferreira et al. |
| 2010/0333039 A1* | 12/2010 | Denkel ............... G06F 3/0482 715/854 |
| 2011/0004598 A1 | 1/2011 | Kikuchi |
| 2011/0066973 A1 | 3/2011 | Plom et al. |
| 2011/0072309 A1 | 3/2011 | Sakai et al. |
| 2011/0078487 A1 | 3/2011 | Nielsen et al. |
| 2011/0126286 A1 | 5/2011 | Nazarov |
| 2011/0153817 A1 | 6/2011 | Wright et al. |
| 2011/0154300 A1 | 6/2011 | Rao et al. |
| 2011/0191343 A1 | 8/2011 | Heaton |
| 2011/0209153 A1 | 8/2011 | Suzuki et al. |
| 2011/0249002 A1 | 10/2011 | Duplessis et al. |
| 2011/0289485 A1 | 11/2011 | Mejdrich et al. |
| 2011/0314343 A1 | 12/2011 | Hoke et al. |
| 2011/0314543 A1 | 12/2011 | Treit et al. |
| 2012/0023475 A1 | 1/2012 | Surazski et al. |
| 2012/0042212 A1 | 2/2012 | Laurenti |
| 2012/0042269 A1 | 2/2012 | Holman |
| 2012/0047421 A1 | 2/2012 | Holman |
| 2012/0079108 A1 | 3/2012 | Findeisen |
| 2012/0079456 A1 | 3/2012 | Kannan et al. |
| 2012/0102029 A1 | 4/2012 | Larson et al. |
| 2012/0117438 A1 | 5/2012 | Shaffer et al. |
| 2012/0137240 A1 | 5/2012 | Krueger |
| 2012/0137273 A1 | 5/2012 | Meijler et al. |
| 2012/0159391 A1 | 6/2012 | Berry et al. |
| 2012/0204156 A1 | 8/2012 | Kettley et al. |
| 2012/0221314 A1 | 8/2012 | Bourlatchkov et al. |
| 2012/0222019 A1 | 8/2012 | Gounares et al. |
| 2012/0222043 A1 | 8/2012 | Gounares et al. |
| 2012/0227040 A1 | 9/2012 | Gounares et al. |
| 2012/0233592 A1 | 9/2012 | Gounares et al. |
| 2012/0233601 A1 | 9/2012 | Gounares et al. |
| 2012/0260135 A1 | 10/2012 | Beck et al. |
| 2012/0290672 A1 | 11/2012 | Robinson et al. |
| 2012/0296991 A1 | 11/2012 | Spivack et al. |
| 2012/0317371 A1 | 12/2012 | Gounares et al. |
| 2012/0317389 A1 | 12/2012 | Gounares et al. |
| 2012/0317421 A1 | 12/2012 | Gounares et al. |
| 2012/0317557 A1 | 12/2012 | Garrett et al. |
| 2012/0317577 A1 | 12/2012 | Garrett et al. |
| 2012/0317587 A1 | 12/2012 | Garrett et al. |
| 2012/0323827 A1 | 12/2012 | Lakshmanan et al. |
| 2012/0324454 A1 | 12/2012 | Gounares et al. |
| 2012/0330700 A1 | 12/2012 | Garg et al. |
| 2013/0018925 A1 | 1/2013 | Pegg |
| 2013/0060372 A1 | 3/2013 | Lokowandt et al. |
| 2013/0061212 A1 | 3/2013 | Krause et al. |
| 2013/0067445 A1 | 3/2013 | Gounares et al. |
| 2013/0073523 A1 | 3/2013 | Gounares et al. |
| 2013/0073604 A1 | 3/2013 | Gounares et al. |
| 2013/0073829 A1 | 3/2013 | Gounares et al. |
| 2013/0073837 A1 | 3/2013 | Li et al. |
| 2013/0074049 A1 | 3/2013 | Gounares et al. |
| 2013/0074055 A1 | 3/2013 | Gounares et al. |
| 2013/0074056 A1 | 3/2013 | Gounares et al. |
| 2013/0074057 A1 | 3/2013 | Gounares et al. |
| 2013/0074058 A1 | 3/2013 | Gounares et al. |
| 2013/0074092 A1 | 3/2013 | Gounares et al. |
| 2013/0074093 A1 | 3/2013 | Gounares et al. |
| 2013/0080760 A1 | 3/2013 | Li et al. |
| 2013/0080761 A1 | 3/2013 | Garrett et al. |
| 2013/0081005 A1 | 3/2013 | Gounares et al. |
| 2013/0085882 A1 | 4/2013 | Gounares et al. |
| 2013/0104107 A1* | 4/2013 | De Smet ............. G06F 11/3664 717/125 |
| 2013/0117280 A1 | 5/2013 | Donaldson |
| 2013/0117753 A1 | 5/2013 | Gounares et al. |
| 2013/0117759 A1 | 5/2013 | Gounares et al. |
| 2013/0145350 A1 | 6/2013 | Marinescu |
| 2013/0159198 A1 | 6/2013 | Cartan |
| 2013/0187941 A1 | 7/2013 | Noon |
| 2013/0212479 A1 | 8/2013 | Willis |
| 2013/0219057 A1 | 8/2013 | Li et al. |
| 2013/0219372 A1 | 8/2013 | Li et al. |
| 2013/0227529 A1 | 8/2013 | Li et al. |
| 2013/0227536 A1 | 8/2013 | Li et al. |
| 2013/0229416 A1 | 9/2013 | Krajec |
| 2013/0232174 A1 | 9/2013 | Krajec |
| 2013/0232433 A1 | 9/2013 | Krajec |
| 2013/0232452 A1 | 9/2013 | Krajec |
| 2013/0235040 A1 | 9/2013 | Jackson, Jr. |
| 2013/0271480 A1 | 10/2013 | Daynes |
| 2013/0282545 A1 | 10/2013 | Gounares et al. |
| 2013/0283102 A1 | 10/2013 | Krajec et al. |
| 2013/0283240 A1 | 10/2013 | Krajec et al. |
| 2013/0283241 A1 | 10/2013 | Krajec et al. |
| 2013/0283242 A1 | 10/2013 | Gounares et al. |
| 2013/0283246 A1 | 10/2013 | Krajec et al. |
| 2013/0283247 A1 | 10/2013 | Krajec et al. |
| 2013/0283281 A1 | 10/2013 | Krajec et al. |
| 2013/0291113 A1 | 10/2013 | Dewey |
| 2013/0298112 A1 | 11/2013 | Gounares et al. |
| 2014/0013306 A1 | 1/2014 | Gounares et al. |
| 2014/0013308 A1 | 1/2014 | Gounares et al. |
| 2014/0013309 A1 | 1/2014 | Gounares |
| 2014/0013311 A1 | 1/2014 | Garrett et al. |
| 2014/0019598 A1 | 1/2014 | Krajec et al. |
| 2014/0019756 A1 | 1/2014 | Krajec et al. |
| 2014/0019879 A1 | 1/2014 | Krajec |
| 2014/0019985 A1 | 1/2014 | Krajec et al. |

(56) References Cited

U.S. PATENT DOCUMENTS

| | | |
|---|---|---|
| 2014/0025572 A1 | 1/2014 | Krajec et al. |
| 2014/0026142 A1 | 1/2014 | Gounares et al. |
| 2014/0040591 A1 | 2/2014 | Gounares et al. |
| 2014/0053143 A1 | 2/2014 | Conrod et al. |
| 2014/0136233 A1 | 5/2014 | Atkinson et al. |
| 2014/0189650 A1 | 7/2014 | Gounares |
| 2014/0189652 A1 | 7/2014 | Gounares |
| 2014/0215444 A1 | 7/2014 | Voccio et al. |
| 2014/0278539 A1 | 9/2014 | Edwards |
| 2014/0317454 A1 | 10/2014 | Gataullin et al. |
| 2014/0317603 A1 | 10/2014 | Gataullin et al. |
| 2014/0317604 A1 | 10/2014 | Gataullin et al. |
| 2014/0317605 A1 | 10/2014 | Gataullin et al. |
| 2014/0317606 A1 | 10/2014 | Gataullin et al. |
| 2014/0359126 A1 | 12/2014 | Breternitz |
| 2014/0365544 A1 | 12/2014 | Moffitt |
| 2014/0365545 A1 | 12/2014 | Moffitt |
| 2015/0029193 A1 | 1/2015 | Krajec |
| 2015/0033172 A1 | 1/2015 | Krajec |
| 2015/0066869 A1 | 3/2015 | Seto et al. |
| 2015/0067652 A1 | 3/2015 | Seto et al. |
| 2015/0067654 A1 | 3/2015 | Seto et al. |
| 2015/0212928 A1 | 7/2015 | Gounares |
| 2015/0242303 A1 | 8/2015 | Gautallin et al. |
| 2015/0347277 A1 | 12/2015 | Gataullin et al. |
| 2015/0347283 A1 | 12/2015 | Gataullin et al. |
| 2015/0347628 A1 | 12/2015 | Krajec |
| 2016/0035115 A1 | 2/2016 | Krajec |
| 2016/0133035 A1 | 5/2016 | Krajec |
| 2016/0196201 A1 | 7/2016 | Seto et al. |
| 2016/0283362 A1 | 9/2016 | Seto et al. |

FOREIGN PATENT DOCUMENTS

| | | |
|---|---|---|
| EP | 610581 | 8/1994 |
| EP | 2390790 | 11/2011 |
| WO | WO0007100 | 2/2000 |
| WO | 2010039893 A | 4/2010 |
| WO | 2011116988 | 9/2011 |
| WO | 2011142720 | 11/2011 |
| WO | 2011146750 | 11/2011 |
| WO | 2012106571 | 8/2012 |
| WO | 2014120263 | 8/2014 |

OTHER PUBLICATIONS

International Search Authority, International Search Report and Written Opinion, Korea Intellectual Property Office, PCT/US2014/011733, May 8, 2014.
Aguilera, et al., "Performance Debugging for Distributed Systems of Black Boxes", ACM, 2003, pp. 74-89.
Hsu, et al., "Visibility Enhancement for Silicon Debug", ACM, 2006, pp. 13-18.
Ungar, et al., "Self", ACM, 2007, pp. 1-50.
Kaya, et al., "Error Pattern Analysis of Augmented Array Codes Using a Visual Debugging Tool", IEEE, 2006, pp. 1-6.
U.S. Appl. No. 13/899,500, Jul. 21, 2014, Office Action.
U.S. Appl. No. 13/899,500, Feb. 4, 2015, Notice of Allowance.
U.S. Appl. No. 13/899,503, Sep. 12, 2014, Office Action.
U.S. Appl. No. 13/899,503, Mar. 11, 2015, Office Action.
U.S. Appl. No. 13/899,503, Nov. 3, 2015, Office Action.
U.S. Appl. No. 13/899,507, Sep. 11, 2014, Office Action.
U.S. Appl. No. 13/899,507, Jan. 7, 2015, Office Action.
"International Search Report Issued in PCT Application No. PCT/US2014/011798", Mailed Date: Jun. 20, 2014, 3 pages.
Supplementary Search Report Issued in European Patent Application No. 13873476.9, mailed date: Aug. 2, 2016, 10 pages.
Barbosa et al. "Interactive SNMP Traffic Analysis Through Information Visualization" In Proceedings of the IEEE Network Operations and Management Symposium (NOMS), Apr. 19, 2010, pp. 73-79.
Dobrev et al. "Visualization of Node Interaction Dynamics in Network Traces" In Proceedings of the 3rd International Conference on Autonomous Infrastructure, Management and Security, AIMS 2009, Enschede, Jun. 30, 2009, pp. 147-160.
Joyce et al. "Monitoring Distributed Systems" in Journal of ACM Transactions on Computer Systems (TOCS), vol. 5, Issue 2, May 1, 1987, pp. 121-150.
International Search Report and Written Opinion for PCT/US2013/043492 mailed Nov. 6, 2013, 11 pages.
International Search Report and Written Opinion for PCT/US2013/073894 mailed Apr. 1, 2014.
International Search Report and Written Opinion for PCT/US2013/044193 mailed Oct. 29, 2013.
International Search Report and Written Opinion for PCT/US2013/046050 mailed Nov. 8, 2013.
International Search Report and Written Opinion for PCT/US2013/046922 mailed Dec. 17, 2013.
International Search Report and Written Opinion for PCT/US2013/043522 mailed Nov. 6, 2013.
Gephi Tutorial Layouts, Gephi, Jun. 13, 2011.
International Search Report and Written Opinion for PCT/US2013/046664 mailed Nov. 20, 2013.
International Search Report and Written Opinion for PCT/US2013/047211 mailed Nov. 27, 2013.
International Search Report and Written Opinion for PCT/US2013/046925 mailed Nov. 25, 2013.
International Search Report and Written Opinion for PCT/US2013/046918 mailed Nov. 25, 2013.
International Search Report and Written Opinion for PCT/US2013/043811 mailed Nov. 28, 2013.
"Method and System for Automatically Tracking User Interactions and Providing Tags to the User Interactions" an IP.com Prior Art Database Technical Disclosure, Dec. 4, 2010.
International Search Report and Written Opinion for PCT/US2014/011727 mailed May 16, 2014.
Grossbart "Javascript Profiling with the Chrome Developer Tools" Smashing Magazine Website, Jun. 12, 2012.
Cantrill "Instrumenting the Real-Time Web: Node.js in Production" Node Summit 2012 Presentation; Jan. 24-25, 2012.
Whitehead "Java Run-Time Monitoring, Part 2: Postcompilation Instrumentation and Performance Monitoring- Interception, Class Wrapping, and Bytecode Instrumentation" IBM.com Website Aug. 5, 2008.
Kinsey "Under the Hood: The JavaScript SDK—Error Handling" Facebook.com website Nov. 1, 2012.
"Automagically Wrapping JavaScript Callback Functions" tlrobinson.net.blog, Oct. 22, 2008.
International Search Report and Written Opinion for PCT/IB2014/060233 mailed Nov. 11, 2014.
Heer et al. "Prefuse" CHI 2005, Conference Proceedings, Conference on Human Factors in Computing Systems; Apr. 2, 2005, pp. 421-430.
European Search Report for EP 13873299 dated Sep. 21, 2016.
U.S. Appl. No. 13/757,598, Jul. 17, 2014, Office Action.
U.S. Appl. No. 13/757,625, Aug. 13, 2014, Office Action.
U.S. Appl. No. 13/757,570, Nov. 14, 2014, Office Action.
U.S. Appl. No. 13/757,625, Jan. 2, 2015, Office Action.
U.S. Appl. No. 13/916,568, Jan. 14, 2015, Notice of Allowance.
U.S. Appl. No. 13/757,598, Feb. 13, 2015, Office Action.
U.S. Appl. No. 13/757,631, Mar. 17, 2015, Office Action.
U.S. Appl. No. 14/455,156 Jun. 3, 2015, Notice of Allowance.
U.S. Appl. No. 14/455,170, Jul. 2, 2015, Notice of Allowance.
U.S. Appl. No. 13/949,978, Jul. 10, 2015, Notice of Allowance.
U.S. Appl. No. 13/757,570, Jul. 29, 2015, Office Action.
U.S. Appl. No. 14/455,202, Jul. 30, 2015, Notice of Allowance.
U.S. Appl. No. 13/757,582, Aug. 7, 2015, Office Action.
U.S. Appl. No. 14/629,322, Aug. 26, 2015, Office Action.
U.S. Appl. No. 13/757,631, Sep. 25, 2015, Notice of Allowance.
U.S. Appl. No. 13/949,978, Nov. 13, 2015, Notice of Allowance.
U.S. Appl. No. 14/629,322, Nov. 20, 2015, Notice of Allowance.
U.S. Appl. No. 14/455,170, Nov. 24, 2015, Notice of Allowance.
U.S. Appl. No. 14/455,202, Dec. 9, 2015, Notice of Allowance.
U.S. Appl. No. 13/757,582, Dec. 21, 2015, Notice of Allowance.

(56) References Cited

OTHER PUBLICATIONS

U.S. Appl. No. 14/455,202, Feb. 4, 2016, Notice of Allowance.
U.S. Appl. No. 14/455,170, Feb. 10, 2016, Notice of Allowance.
U.S. Appl. No. 14/995,872, Feb. 26, 2016, Office Action.
U.S. Appl. No. 14/995,872, Jun. 9, 2016, Notice of Allowance.
U.S. Appl. No. 13/949,994, Aug. 26, 2016, Office Action.
U.S. Appl. No. 13/899,503, Oct. 5, 2016, Office Action.
U.S. Appl. No. 13/757,570, Nov. 17, 2016, Office Action.
Kumar, et al., "Visualization of Clustered Directed Acyclic Graphs with Node Interleaving", ACM, pp. 1800-1805, Mar. 2009.
Natour, "On the Control Dependence in the Program Dependence Graph", ACM, pp. 510-519, 1988.
Ioannidis et al., "Transitive Closure Algorithms Based on Graph Traversal", ACM Transactions on Database sSystems, vol. 18, No. 3, pp. 512-579, Sep. 1993.
Fu, et al., "De-anonymizing Social Graphs via Node Similarity", ACM, pp. 263-264, Apr. 2014.
Office Action dated May 24, 2016 cited in U.S. Appl. No. 14/666,120.
Office Action dated Jun. 2, 2016 cited in U.S. Appl. No. 13/899,503.
Huang et al. "Force-Transfer: A New Approach to Removing Overlapping Nodes in Graph Layout", ACM, pp. 1-10, 2003.
Nusayr et al. "Using AOP for Detailed Runtime Monitoring Instrumentation", ACM, pp. 8-14, 2009.
Reiss, "Visualization Program Execution Using User Abstractions", ACM, pp. 125-134, 2006.
Notice of Allowance dated Jan. 20, 2017 cited in U.S. Appl. No. 14/666,120.
Office Action issued in Chinese Patent Application No. 201380075229.5 mailed Mar. 1, 2017.
U.S. Appl. No. 14/883,554, Feb. 22, 2017, Office Action.
European Search Report for EP 14801342 dated Dec. 6, 2016.
Vetter et al. "Real-Time Performance Monitoring, Adaptive Control, and Interactive Steering of Computational Grids", International Journal of High Performance Computing Applications, vol. 14, No. 4, 2000, pp. 357-366.
Office Action issued in Chinese Patent Application No. 201480029533.0 dated Mar. 20, 2017.
Supplementary European Search Report issued in EPO Application No. 14801342.8 dated Apr. 10, 2017.
Bita Mazloom et al: "Dataflow Tomography", ACM Transactions on Architecture and Code Optimization, vol. 9, No. 1, Mar. 2012, pp. 1-26.
Lienhard A et al: "Taking an object-centric view on dynamic information with object flow analysis", Computer Languages. Systems & Structures, Pergamon, Amsterdam, NL, vol. 25, No. 1, Apr. 2009, pp. 63-79.
Extended European Search Report issued in EPO Patent Application No. 14829908.4 dated Apr. 11, 2017.
U.S. Appl. No. 14/883,554, filed May 5, 2017, Notice of Allowance.
Extended Search Report Issued in European Patent Application No. 14843127.3, dated Apr. 13, 2017, 9 pages.
First Office Action and Search Report Issued in Chinese Patent Application No. 201380075253.9, dated Apr. 5, 2017, 27 pages.
U.S. Appl. No. 13/949,994, filed May 19, 2017, Office Action.
U.S. Appl. No. 13/757,570, filed May 19, 2017, Office Action.

\* cited by examiner

ANIMATED HIGHLIGHTS IN A GRAPH REPRESENTING AN APPLICATION

BACKGROUND

A programmer often examines and tests an application during development in many different manners. The programmer may run the application in various use scenarios, apply loading, execute test suites, or perform other operations on the application in order to understand how the application performs and to verify that the application operates as designed.

As the programmer identifies a problem area, the programmer may locate the problem area in source code and improve or change the code in that area. Such improvements may then be tested again to verify that the problem area was corrected.

SUMMARY

Code elements may be selected from a graph depicting an application. The graph may show code elements as nodes, with edges representing connections between the nodes. The connections may be messages passed between code elements, code flow relationships, or other relationships. When a code element or group of code elements are selected from the graph, the corresponding source code may be displayed. The code may be displayed in a code editor or other mechanism by which the code may be viewed, edited, and manipulated.

Breakpoints may be set by selecting nodes on a graph depicting code elements and relationships between code elements. The graph may be derived from tracing data, and may reflect the observed code elements and the observed interactions between code elements. In many cases, the graph may include performance indicators. The breakpoints may include conditions which depend on performance related metrics, among other things. In some embodiments, the nodes may reflect individual instances of specific code elements, while other embodiments may present nodes as the same code elements that may be utilized by different threads. The breakpoints may include parameters or conditions that may be thread-specific.

Relationships between code elements in an application may be selected and used during analysis and debugging of the application. An interactive graph may display code elements and the relationships between code elements, and a user may be able to select a relationship from the graph, whereupon details of the relationship may be displayed. The details may include data passed across the relationship, protocols used, as well as the frequency of communication, latency, queuing performance, and other performance metrics. A user may be able to set breakpoints, increase or decrease tracing options, or perform other actions from the relationship selection.

Highlighted objects may traverse a graph representing an application's code elements and relationships between those code elements. The highlighted objects may be animated to represent how the objects are processed in an application. The graph may represent code elements and relationships between the code elements, and the highlighting may be generated by tracing the application to determine the flow of the object through code elements and across relationships. A user may control the highlighted graph with a set of playback controls for playing through the sequence of highlights on the graph. The playback controls may include pause, rewind, forward, fast forward, and other controls. The controls may also include a step control which may step through small time increments.

A graph representing code element and relationships between code elements may have elements combined to consolidate or collapse portions of the graph. A filter may operate between the graph data and a renderer to show the graph in different states. The graph may be implemented with an interactive user interface through which a user may select a node, edge, or groups of nodes and edges, then apply a filter or other transformation. When the user selects to combine a group of code elements, the combined elements may be displayed as a single element. In some cases, the single element may be presented with visual differentiation to show that the element is a collapsed or combined element, as opposed to a singleton element.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
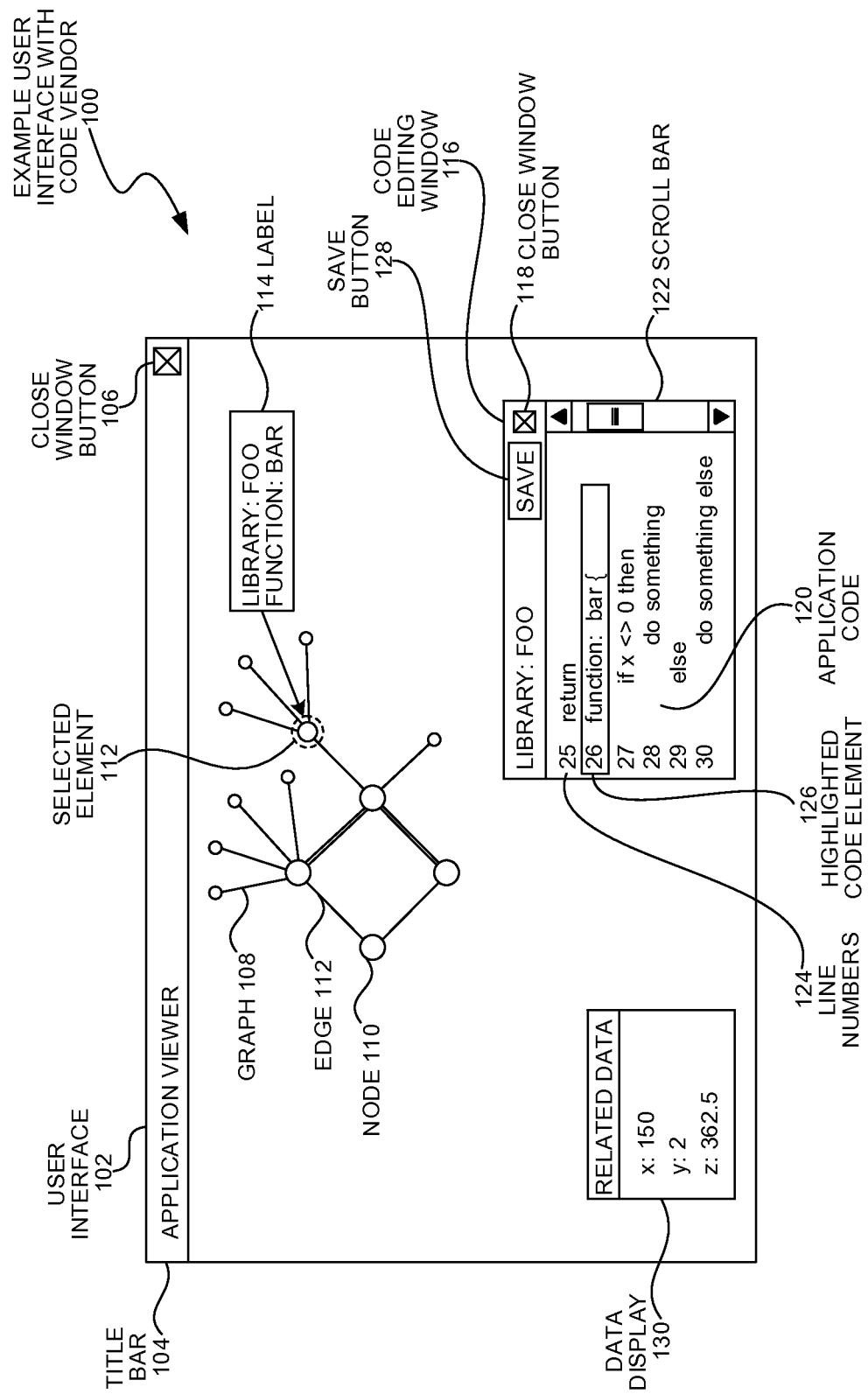
FIG. 1 is a diagram illustration of an embodiment showing a user interface with an interactive graph representing code elements and relationships between the code elements.

Navigating Source Code Through an Interactive Graph

A graph showing code elements and relationships between code elements may be used to select and display the code elements. The graph may represent both static and dynamic relationships between the code elements, including performance another metrics gathered while tracing the code elements during execution.

The interactive graph may have active input areas that may allow a user to select a node or edge of the graph, where the node may represent a code element and the edge may represent a relationship between code elements. After selecting the graph element, the corresponding source code or other representation of the code element may be displayed.

In some cases, the code elements may be displayed in a code editor, and a user may be able to edit the code and perform various functions on the code, including compiling and executing the code. The selected code elements may be displayed with highlighting or other visual cues so that a programmer may easily identify the precise line or lines of code represented by a node selected from the graph.

A selection of an edge may identify two code elements, as each edge may link the two code elements. In such a case, some embodiments may display both code elements. Such code elements may both be displayed on a user interface simultaneously using different display techniques.

Other embodiments may display one of the code elements linked by an edge. Some such embodiments may present a user interface that may allow a user to select between the two code elements. In one such example, a user interface may be presented that queries the user to select an upstream or downstream element when the relationship has a notion of directionality. In another example, a user interface may merely show the individual lines of code associated with each node, then permit the user to select the line of code for further investigation and display.

The graph may contain information derived from static and dynamic analysis of an application. Static analysis may identify blocks of code as well as some relationships, such as a call tree or flow control relationships between code elements. Dynamic analysis may identify blocks of code by analyzing the code in an instrumented environment to detect blocks of code and how the code interacts during execution. Some embodiments may identify messages passed between code elements, function calls made from one code element to another, or other relationships.

The graph may display summarized or other observations about the execution of the code. For example, a tracer may gather data about each code element, such as the amount of processor or memory resources consumed, the amount of garbage collection performed, number of cache misses, or any of many different performance metrics.

The graph may be displayed with some representation of performance metrics. For example, a code element may be displayed with a symbol, size, color, or other variation that may indicate a performance metric. In a simple example, the size of a symbol displaying a node may indicate the processing time consumed by the element. In another example, the width of an edge may represent the amount of data passed between code elements or the number of messages passed.

Breakpoints Set Through an Interactive Graph.

An interactive graph may serve as an input tool to select code elements from which breakpoints may be set. Objects relating to a selected code element may be displayed and a breakpoint may be created from one or more of the objects. In some cases, the breakpoints may be applied to the selected code element or to an object such that the breakpoint may be satisfied with a different code element.

The interactive graph may display code elements and relationships between code elements, and may visually illustrate the operation of an application. The graph may be updated in real time or near real time, and may show performance related metrics using various visual effects. A user may interact with the graph to identify specific code elements that may be of interest, then select the code elements to create a breakpoint.

Performance and other tracer data may be displayed with the selected code elements. Such data may include metrics, statistics, and other information relating to the specific code element. Such metrics may be, for example, resource consumption statistics for memory, processor, network, or other resources, comparisons between the selected code elements and other code elements, or other data. In some cases, the metrics may include parameters that may be incorporated into a breakpoint.

Because the graph may contain performance related data, a user may observe the operations and performance of an application prior to selecting where to insert a breakpoint. The combination of performance data and relationship structure of the application may greatly assist a user in selecting a meaningful location for a breakpoint. The relationship structure may help the user understand the application flow, as well as identify dependencies and bottlenecks that may not be readily apparent from the source code. The performance data may identify those application elements that may be performing above or below expectations. The combination of both the relationship structure and the performance data may be much more efficient and meaningful than other methods for identifying locations for breakpoints.

Selecting Relationships as an Input

A relationship between code elements may be selected from an interactive graph representing code elements as nodes and relationships between code elements as edges. The relationship may represent many different types of relationships, from function calls to shared memory objects. Once selected, the relationship may be used to set breakpoints, monitor communications across the relationship, increase or decrease tracing activities, or other operations.

The relationship may be a message passing type of relationship, some of which may merely pass acknowledgements while others may include data objects, code elements, or other information. Some message passing relationships may be express messages, which may be managed with queues and other message passing components. Other message passing relationships may be implied messages, where program flow, data, or other elements may be passed from one code element to another.

The relationship may be a shared memory relationship, which may represent memory objects that may be written by one code element and read by another code element. Such a relationship may be identified when the first code element may take a write lock on the memory object and the second code element may be placed in a waiting state until the write lock may be released.

A breakpoint may be set using information related to the relationship. For example, the breakpoint may be set for messages passed across the selected relationship, such as when messages exceed a certain size, frequency, or contain certain parameters or parameter values.

Highlighting Objects in an Animated Graph Depicting an Executing Application.

Objects may be highlighted in an animated graph depicting an application being executed. The graph may contain nodes representing code elements and edges representing relationships between the code elements. The highlighted objects may represent data elements, requests, processes, or other objects that may traverse from one code element to another.

The highlighted objects may visually depict how certain components may progress through an application. The highlights may visually link the code elements together so that an application programmer may understand the flow of the application with respect to a particular object.

In one use scenario, an application that may process web requests may be visualized. An incoming request may be identified and highlighted and may be operated upon by several different code elements. The graph depicting the application may have a highlighted visual element, such as a bright circle, placed on a node representing the code element that receives the request. As the request is processed by subsequent code elements, the graph may show the highlighted bright circle traversing various relationships to be processed by other code elements. The request may be processed by multiple code elements, and the highlighted bright circle may be depicted over each of the code elements in succession.

The highlighted objects may represent a single data element, a group of data elements, or any other object that may be passed from one code element to another. In some cases, the highlighted object may be an executable code element that may be passed as a callback or other mechanism.

Callbacks may be executable code that may be passed as an argument to other code, which may be expected to execute the argument at a convenient time. An immediate invocation may be performed in the case of a synchronous callback, while asynchronous callbacks may be performed at some later time. Many languages may support callbacks, including C, C++, Pascal, JavaScript, Lua, Python, Perl, PHP, Ruby, C#, Visual Basic, Smalltalk, and other languages. In some cases, callbacks may be expressly defined and implemented, while in other cases callbacks may be simulated or have constructs that may behave as callbacks. Callbacks may be implemented in object oriented languages, functional languages, imperative languages, and other language types.

The animation of a graph may include playback controls that may pause, rewind, play, fast forward, and step through the sequence of code elements that an object may encounter. In many applications, the real time speed of execution is much faster than a human may be able to comprehend. A human user may be able to slow down or step through a sequence of operations so that the user can better understand how the application processes the highlighted object.

Combining and Expanding Elements on a Graph Representing an Application

A graph representing code elements and relationships between code elements of an application may be filtered to combine a group of elements to represent the group of elements as a single element on the graph. The graph may have interactive elements by which a user may select nodes to manipulate, and through which a filter may be applied.

The filters may operate as a transformation, translation, or other operation to prepare the graph data prior to rendering. The filters may include consolidating multiple nodes into a single node, expanding a single node into multiple nodes, applying highlights or other visual cues to the graph elements, adding performance data modifiers to graph elements, and other transformations and operations.

The filters may enable many different manipulations to be applied to tracer data. In many cases, a data stream may be transmitted to a rendering engine and the filters may be applied prior to rendering. Such cases may allow tracer data to be transmitted and stored in their entirety, while allowing customized views of the data to be shown to a user.

The term "filter" as used in this specification and claims refers to any transformation of data prior to display. A filter may remove data, concatenate data, summarize data, or perform other manipulations. In some cases, a filter may combine one data stream with another. A filter may also analyze the data in various manners, and apply highlights or other tags to the data so that a rendering engine may render a graph with different features. The term "filter" is meant to include any type of transformation that may be applied to data and is not meant to be limiting to a transformation where certain data may be excluded from a data stream.

The graph may have interactive elements by which various filters may be applied. The interactive elements may include selecting nodes, edges, or groups of nodes and edges to which a filter may be applied. In some cases, a legend or other interactive element may serve as a mechanism to identify groups of nodes to which filters may be applied.

When a filter is applied, some embodiments may apply different highlighting or other visual differentiations. Such highlighting may indicate that filters or transformations had been applied to the highlighted elements.

Throughout this specification and claims, the terms "profiler", "tracer", and "instrumentation" are used interchangeably. These terms refer to any mechanism that may collect data when an application is executed. In a classic definition, "instrumentation" may refer to stubs, hooks, or other data collection mechanisms that may be inserted into executable code and thereby change the executable code, whereas "profiler" or "tracer" may classically refer to data collection mechanisms that may not change the executable code. The use of any of these terms and their derivatives may implicate or imply the other. For example, data collection using a "tracer" may be performed using non-contact data collection in the classic sense of a "tracer" as well as data collection using the classic definition of "instrumentation" where the executable code may be changed. Similarly, data collected through "instrumentation" may include data collection using non-contact data collection mechanisms.

Further, data collected through "profiling", "tracing", and "instrumentation" may include any type of data that may be collected, including performance related data such as processing times, throughput, performance counters, and the like. The collected data may include function names, parameters passed, memory object names and contents, messages passed, message contents, registry settings, register contents, error flags, interrupts, or any other parameter or other collectable data regarding an application being traced.

Throughout this specification and claims, the term "execution environment" may be used to refer to any type of supporting software used to execute an application. An example of an execution environment is an operating system. In some illustrations, an "execution environment" may be shown separately from an operating system. This may be to illustrate a virtual machine, such as a process virtual machine, that provides various support functions for an application. In other embodiments, a virtual machine may be a system virtual machine that may include its own internal operating system and may simulate an entire computer system. Throughout this specification and claims, the term "execution environment" includes operating systems and other systems that may or may not have readily identifiable "virtual machines" or other supporting software.

Throughout this specification, like reference numbers signify the same elements throughout the description of the figures.

In the specification and claims, references to "a processor" include multiple processors. In some cases, a process that may be performed by "a processor" may be actually performed by multiple processors on the same device or on different devices. For the purposes of this specification and claims, any reference to "a processor" shall include multiple processors which may be on the same device or different devices, unless expressly specified otherwise.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing an example user interface with an interactive graph and application code representing a selected code element. A user may navigate the source code of an application by interacting with the graph, which may cause a window or other viewing mechanism to display the source code and other information.

The graph may show individual code elements and the relationships between code elements. In many embodiments, performance metrics may be displayed as part of the graph, and the performance metrics may help a programmer identify areas of code for inspection. For example, performance bottlenecks, poorly executing code, or other conditions may be highlighted by visually representing performance data through the graph elements, and a programmer may identify a code element based on the performance data for further analysis.

Embodiment 100 illustrates a user interface 102 that may contain a title bar 104, close window button 106, and other elements of a user interface window as an example user interface.

A graph 108 may be displayed within the user interface 102. The graph may represent code elements and the relationships between code elements in an application. The code elements may be represented as nodes 110 and the relationships between code elements may be represented as edges 112. In some cases, code elements without relationships between code elements may be included, and such code elements may be presented as a single node element that may be unconnected to other code elements The graph 108 may represent an application, where each code element may be some unit of executable code that may be processed by a processor. In some cases, a code element may be a function, process, thread, subroutine, or some other block or group of executable code. In some cases, the code elements may be natural partitions or groupings that may be created by a programmer, such as function definitions or other such grouping.

In other cases, one or more of the code elements may be arbitrarily defined or grouped, such as an embodiment where some number of lines of executable code may be treated as a code element. In one such example, each group of 10 lines of code may be identified as a code element. Other embodiments may have other mechanisms for identifying natural or arbitrary code elements.

The graph 108 may display both static and dynamic data regarding an application. Static data may be any information that may be gathered through static code analysis, which may include control flow graphs, executable code elements, some relationships between code elements, or other information.

Dynamic data may be any information that may be gathered through tracing or monitoring of the application as the application executes. Dynamic data may include code element definitions, relationships between code elements, as well as performance metrics, operational statistics, or other measured or gathered data.

The graph 108 may present performance and operational data using visual representations of the data. For example, the size of an icon on a particular node may indicate a measurement of processing time, memory, or other resource that a code element may have consumed. In another example, the thickness, color, length, animation, or other visual characteristic of an edge may represent various performance factors, such as the amount of data transmitted, the number of messages passed, or other factors.

The graph 108 may include results from offline or other analyses. For example, an analysis may be performed over a large number of data observations to identify specific nodes and edges that represent problem areas of an application. One such example may be bottleneck analysis that may identify a specific code element that may be causing a processing slowdown. Such results may be displayed on the graph 108 by highlighting the graph, enlarging the affected nodes, animating the nodes and edges, or some other visual cue.

Real time data may be displayed on a graph 108. The real time data may include performance metrics that may be gathered during ongoing execution of the application, including displaying which code elements have been executed recently or the performance measured for one or more code elements.

A user may interact with the graph 108 to select an element 112. The user may select the element 112 using a cursor, touchscreen, or other input mechanism. In some embodiments, when hovering over the selected element 112 or selecting the selected element 112 may cause a label 114 to be displayed. The label 114 may include some information, such as library name, function name, or other identifier for the code element.

After selecting the element 112, a code editing window 116 may be presented on the user interface 102. The code editing window 116 may be a window having a close window button 118, scroll bar 122, and other elements. In some cases, the code editing window 116 may float over the graph 108 and a user may be able to move or relocate the code editing window 116.

Application code 120 may be displayed in the code editing window 116. The application code 120 may be displayed with line numbers 124, and a code element 126 may be highlighted.

The application code 120 may be the source code representation of the application being tested. In languages with compiled code, the source code may have been compiled prior to execution. In languages with interpreted code, the source code may be consumed directly by a virtual machine, just in time compiler, or other mechanism.

In some applications, the code editing window 116 may be part of an integrated development environment, which may include compilers, debugging mechanisms, execution management mechanisms, and other components. An integrated development environment may be a suite of tools through which a programmer may develop, test, and deploy an application.

A highlighted code element 126 may be shown in the code editing window 116. The highlighted code element 126 may represent the portion of the application represented by the selected element 112. In some cases, the highlighted code element 126 may illustrate a subset of many lines of code represented by the selected element 112. One example may highlight the first line of many lines of code represented by the selected element 112. In other cases, the highlighted code element 126 may identify all of the code represented by the selected element 112.

A data display 130 may contain various additional information that may be useful for a programmer. In some cases, the data display 130 may include parameter values for memory objects used by the application. In some cases, the data display 130 may include performance data gathered from a tracer, which sometimes may be summary data or statistics.

Figure 2:
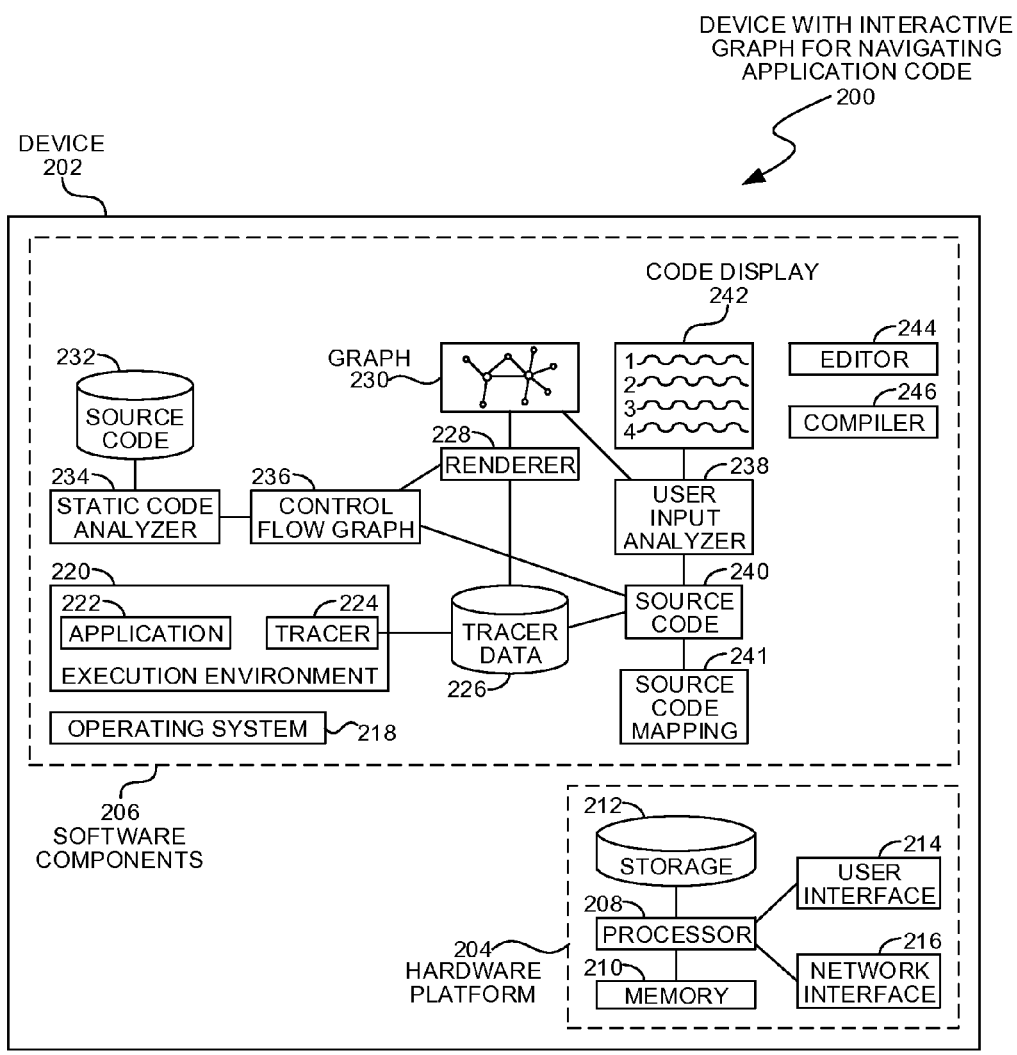
FIG. 2 is a diagram illustration of an embodiment showing a device that may display an interactive graph representing an application being traced.

FIG. 2 illustrates an embodiment 200 showing a single device with an interactive graph for navigating application code. Embodiment 200 is merely one example of an architecture where a graph may be rendered on a display, and a user may select nodes or edges of the graph to display portions of the underlying source code for the application.

The diagram of FIG. 2 illustrates functional components of a system. In some cases, the component may be a hardware component, a software component, or a combination of hardware and software. Some of the components may be application level software, while other components may be execution environment level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 200 illustrates a device 202 that may have a hardware platform 204 and various software components. The device 202 as illustrated represents a conventional computing device, although other embodiments may have different configurations, architectures, or components.

In many embodiments, the device 202 may be a server computer. In some embodiments, the device 202 may still also be a desktop computer, laptop computer, netbook computer, tablet or slate computer, wireless handset, cellular telephone, game console or any other type of computing device.

The hardware platform 204 may include a processor 208, random access memory 210, and nonvolatile storage 212. The hardware platform 204 may also include a user interface 214 and network interface 216.

The random access memory 210 may be storage that contains data objects and executable code that can be quickly accessed by the processors 208. In many embodiments, the random access memory 210 may have a high-speed bus connecting the memory 210 to the processors 208.

The nonvolatile storage 212 may be storage that persists after the device 202 is shut down. The nonvolatile storage 212 may be any type of storage device, including hard disk, solid state memory devices, magnetic tape, optical storage, or other type of storage. The nonvolatile storage 212 may be read only or read/write capable. In some embodiments, the nonvolatile storage 212 may be cloud based, network storage, or other storage that may be accessed over a network connection.

The user interface 214 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 216 may be any type of connection to another computer. In many embodiments, the network interface 216 may be a wired Ethernet connection. Other embodiments may include wired or wireless connections over various communication protocols.

The software components 206 may include an operating system 218 on which various software components and services may operate. An operating system may provide an abstraction layer between executing routines and the hardware components 204, and may include various routines and functions that communicate directly with various hardware components.

An execution environment 220 may manage the execution of an application 222. The operations of the application 222 may be captured by a tracer 224, which may generate tracer data 226. The tracer data 226 may identify code elements and relationships between the code elements, which a renderer 228 may use to produce a graph 230. The graph 230 may be displayed on an interactive display device, such as a touchscreen device, a monitor and pointer device, or other physical user interface.

In some embodiments, the graph 230 may be created in whole or in part from data derived from source code 232. A static code analyzer 234 may generate a control flow graph 236 from which the renderer 228 may present the graph 230.

In some embodiments, the graph 230 may contain data that may be derived from static sources, as well as data from dynamic or tracing sources. For example, a graph 230 may contain a control flow graph on which tracing data may be overlaid to depict various performance or other dynamic data. Dynamic data may be any data that may be derived from measuring the operations of an application during execution, whereas static data may be derived from the source code 232 or other representation of the application without having to execute the application.

A user input analyzer 238 may receive selections or other user input from the graph 230. The selections may identify specific code elements through the selection of one or more nodes, specific relationships through the selection of one or more edges, or other user input. In some cases, the selections may be made by picking displayed objects in the graph in an interactive manner. In some cases, other user interface mechanisms may be used to select objects represented by the graph. Such other user interface mechanisms may include command line interfaces or other mechanisms that may select objects.

When a selection for a specific node may be received by the user input analyzer 238, a code display 242 may be presented on a user interface, and the code display 242 may display source code 240 that corresponds with the selection on the graph 230.

A selection on the graph 230 may be correlated with a line number or other component in source code 240 through a source code mapping 241. The source code mapping 241 may contain hints, links, or other information that may map source code to the code elements represented by a node on the graph 230. In many programming environments, source code may be compiled or interpreted in different manners to yield executable code.

For example, source code may be compiled into intermediate code, which may be compiled with a just in time compiler into executable code, which may be interpreted in a process virtual machine. In each step through the execution phase, the compilers, interpreters, or other components may update the source code mapping 241. Other embodiments may have other mechanisms to determine the appropriate source code for a given code element represented by a node on the graph 230.

The graph 230 and other elements may be part of an integrated development environment. An integrated development environment may be a single application or group of tools through which a developer may create, edit, compile, debug, test, and execute an application. In some cases, an integrated development environment may be a suite of applications and components that may operate as a cohesive, single application. In other cases, such a system may have distinct applications or components. An integrated development environment may include an editor 244 and compiler 246, as well as other components, such as a debugger, execution environment 220 and other components.

Some embodiments may incorporate an editor 244 with the code display 242. In such an embodiment, the code display 242 may be presented using an editor 244, so that the user may be able to edit the code directly upon being displayed.

In some cases, a programmer may use independent applications for developing applications. In such cases, the editor 244, compiler 246, and other components may be distinct applications that may be invoked using command line interfaces, graphical user interfaces, or other mechanisms.

Figure 3:
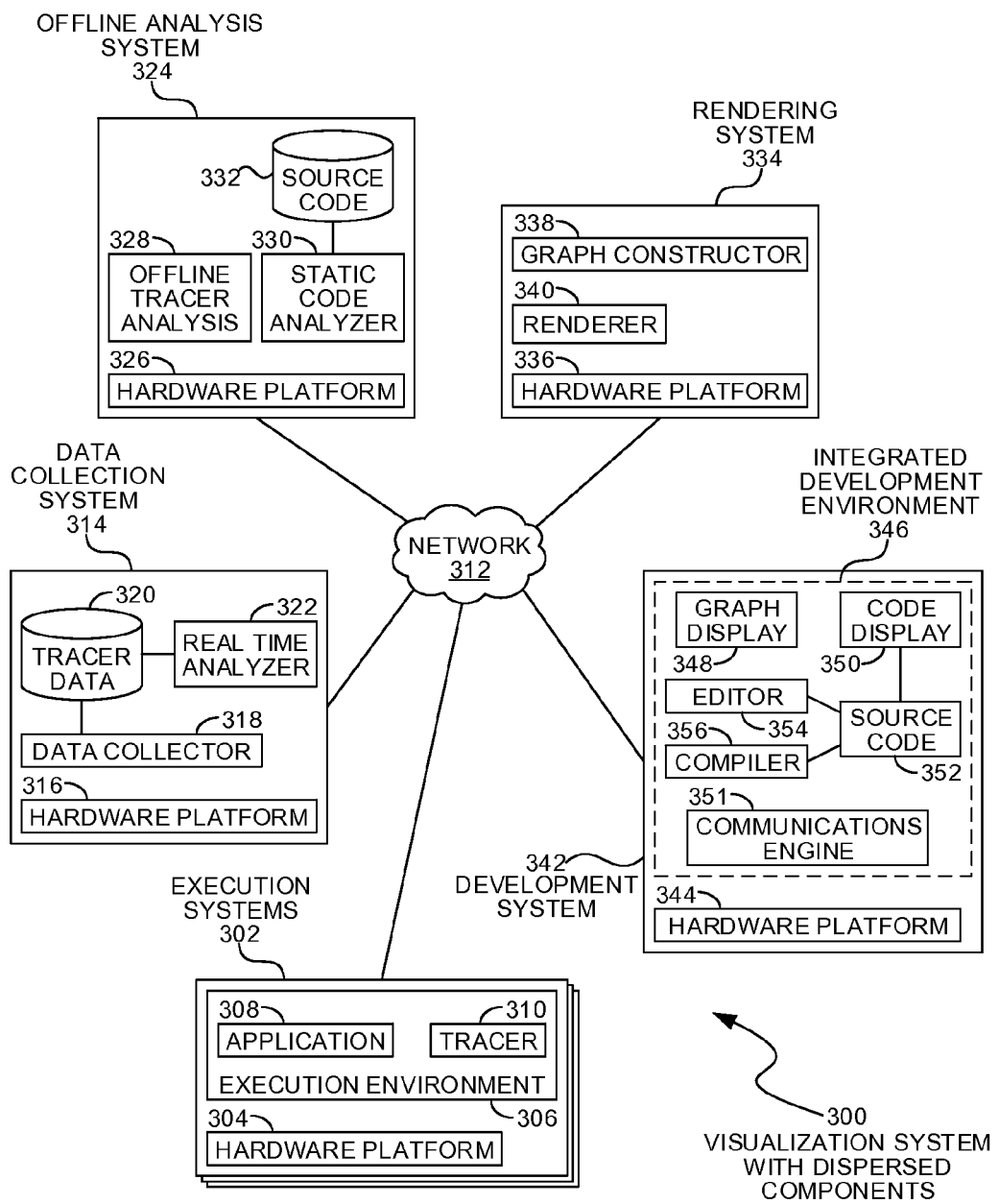
FIG. 3 is a diagram illustration of an embodiment showing a network environment with a visualization system with dispersed components.

FIG. 3 illustrates an embodiment 300 showing multiple devices that may generate an interactive graph for navigating application code. Embodiment 300 is merely one example of an architecture where some of the functions of embodiments 100 and 200 may be delivered across a network by disparate devices.

The diagram of FIG. 3 illustrates functional components of a system. In some cases, the component may be a hardware component, a software component, or a combination of hardware and software. Some of the components may be application level software, while other components may be execution environment level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 300 may represent one example where multiple devices may deliver an interactive graph to a development environment. Once the graph is presented, a user may interact with the graph to navigate through the application code.

Embodiment 300 may be similar in function to embodiment 200, but may illustrate an architecture where other devices may perform various functions. By having a dispersed architecture, certain devices may perform only a subset of the operations that may be performed by the single device in embodiment 200. Such an architecture may allow computationally expensive operations to be placed on devices with different capabilities, for example.

Embodiment 300 may also be able to create a graph that represents an application executing on multiple devices. A set of execution systems 302 may contain a hardware platform 304, which may be similar to the hardware platform 204 of embodiment 200. Each hardware platform 304 may support an execution environment 306, where an application 308 may execute and a tracer 310 may collect various tracer data, including performance data.

Many applications may execute on multiple devices. Some such applications may execute multiple instances of the application 308 in parallel, where the instances may be identical or nearly identical to each other. In other cases, some of the applications 308 may be different and may operate in serial or have some other process flow.

A network 312 may connect the various devices in embodiment 300. The network 312 may be any type of communication network by which devices may be connected.

A data collection system 314 may collect and process tracer data. The data collection system 314 may receive data from the tracer 310 and store the data in a database. The data collection system 314 may perform some processing of the data in some cases.

The data collection system 314 may have a hardware platform 316, which may be similar to the hardware platform 204 of embodiment 200. A data collector 318 may receive and store tracer data 320 from the various tracers 310. Some embodiments may include a real time analyzer 322 which may process the tracer data 320 to generate real time information about the application 308. Such real time information may be displayed on a graph representing the application 308.

An offline analysis system 324 may analyze source code or other representations of the application 308 to generate some or all of a graph representing the application 308. The offline analysis system 324 may execute on a hardware platform 326, which may be similar to the hardware platform 204 of embodiment 200.

The offline analysis system 324 may perform two different types of offline analysis. The term offline analysis is merely a convention to differentiate between the real time or near real time analysis and data that may be provided by the data collection system 314. In some cases, the operations of the offline analysis system 324 may be performed in real time or near real time.

Offline tracer analysis 328 may be a function that performs in depth analyses of the tracer data 320. Such analyses may include correlation of multiple tracer runs, summaries of tracer data, or other analyses that may or may not be able to be performed in real time or near real time.

A static code analyzer 330 may analyze the source code 332 to create a control flow graph or other representation of the application 308. Such a representation may be displayed as part of an interactive graph from which a user may navigate the application and its source code.

A rendering system 334 may gather information relating to an interactive graph and create an image or other representation that may be displayed on a user's device. The rendering system 334 may have a hardware platform 336, which may be similar to the hardware platform 204 of embodiment 200, as well as a graph constructor 338 and a renderer 340.

The graph constructor 338 may gather data from various sources and may construct a graph which the renderer 340 may generate as an image. The graph constructor 338 may gather such data from the offline analysis system 324 as well as the data collection system 314. In some embodiments, the graph may be constructed from offline data analysis only, while in other embodiments, the graph may be constructed from only from data collected through tracing.

A development system 342 may represent a user's device where a graph may be displayed and application code may be navigated. In some embodiments, the development system 342 may include an integrated development environment 346.

The development system 342 may have a hardware platform 344, which may be similar to the hardware platform 204 of embodiment 200. Several applications may execute on the hardware platform 344. In some cases, the various applications may be components of an integrated development environment 346, while in other cases, the applications may be independent applications that may or may not be integrated with other applications.

The applications may include a graph display 348, which may display a graph image created by the renderer 340. In some cases, the graph display 348 may include real time data, including performance data that may be generated by a real time analyzer 322. When a user interacts with the graph display 348, a code display 350 may be presented that may include source code 352 represented by a selected graph element. The applications may also include an editor 354 and compiler 356.

A communications engine 351 may gather data from the various sources so that a graph may be rendered. In some cases, the communications engine 351 may cause the graph constructor 338 to retrieve data from the static code analyzer 330, the offline tracer analysis 328, and the real time analyzer 322 so that the renderer 340 may create a graph image.

Figure 4:
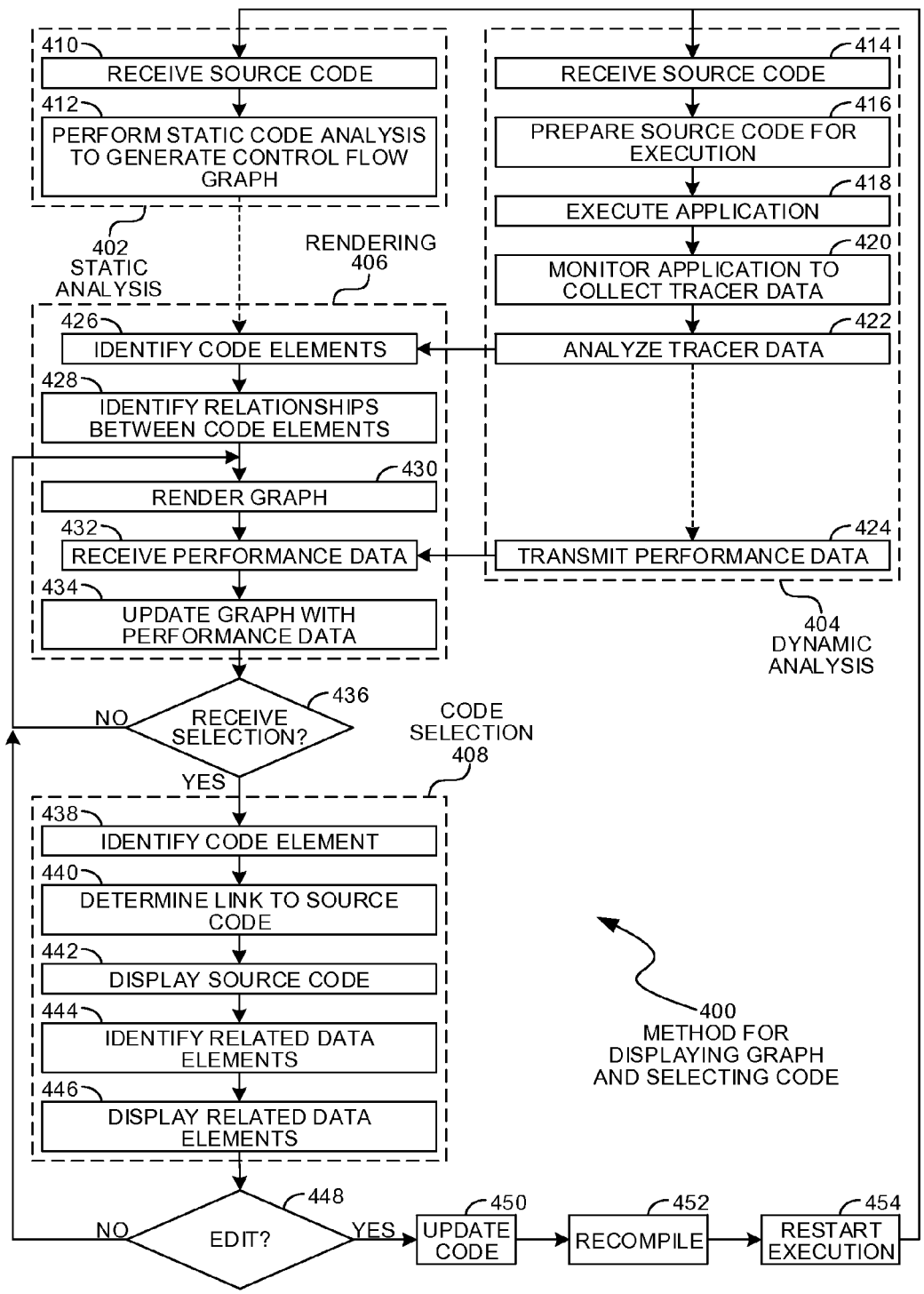
FIG. 4 is a flowchart illustration of an embodiment showing a method for displaying a graph and selecting source code to display in response to an interaction with the graph.

FIG. 4 is a flowchart illustration of an embodiment 400 showing a method for displaying a graph and selecting and presenting code in response to a selection from the graph. Embodiment 300 may illustrate a method that may be performed by the device 202 of embodiment 200 or the collective devices of embodiment 300.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 may illustrate a method that includes static analysis 402, dynamic analysis 404, rendering 406, and code selection 408. The method represented one method for navigating an application code through a visual representation of the application as a graph, which may have nodes representing code elements and edges representing relationships between the code elements.

The graph may be generated from static analysis 402, dynamic analysis 404, or a combination of both, depending on the application.

The static analysis 402 may include receiving source code in block 410 and performing static code analysis in block 412 to generate a control flow graph or other representation of the application. A control flow graph may identify blocks of executable code and the relationships between them. Such relationships may include function calls or other relationships that may be expressed in the source code or may be derived from the source code.

The dynamic analysis 404 may include receiving the source code in block 414, preparing the source code for execution in block 416, and executing the application in block 418 from which the source code may be monitored in block 420 to generate tracer data. The dynamic analysis 404 may identify code elements and relationships between code elements by observing the actual behavior of the code during execution.

The dynamic analysis 404 may include the operations to trace the application. In many cases, an application may be compiled or otherwise processed when being prepared for execution in block 416. During execution in block 418, a tracer may be configured to gather various metrics about the application, which may include identifying code elements and relationships between code elements.

A graph generated from static code analysis may be different from a graph generated by dynamic analysis. In general, static code analysis may identify multiple relationships that may not actually be exercised during execution under normal circumstances or loading. In contrast, the dynamic analysis may generate a graph that represents the actual portions of the application that were exercised.

In many cases, the dynamic analysis 404 may include gathering performance data in block 424. The performance data may be added to a graph to help the user understand where performance bottlenecks may occur and other performance related information.

The rendering 406 may include identifying code elements in block 426 and relationships may be identified in block 428. In some embodiments, the code elements and relationships may be identified using static code analysis, whereas other embodiments may identify code elements and relationships using dynamic analysis or a combination of static or dynamic analysis.

The graph may be rendered in block 430 once the code elements and relationships are identified. In some embodiments, performance data may be received in block 432 and the graph may be updated with performance data in block 434.

When performance data are available, if no selection has been received in block 436, the process may loop back to block 430 to render the graph with updated performance data. Such a loop may update the graph with real time or near real time performance data.

When a selection is made in block 436, a code element may be identified in block 438. The code element may correspond with an element selected from the graph, which may be one or more nodes or edges of the graph. A link to the source code from the selected element may be determined in block 440 and the source code may be displayed in block 442. Any related data elements may be identified in block 444 and may be displayed in block 446.

If a user does not elect to edit the source code in block 448, the process may loop back to block 430 to update the graph with performance data.

If the user elects to edit the source code in block 448, the code may be updated in block 450, recompiled in block 452, and the execution may be restarted in block 454. The process may return to blocks 410 and 414 to generate a new graph.

Figure 5:
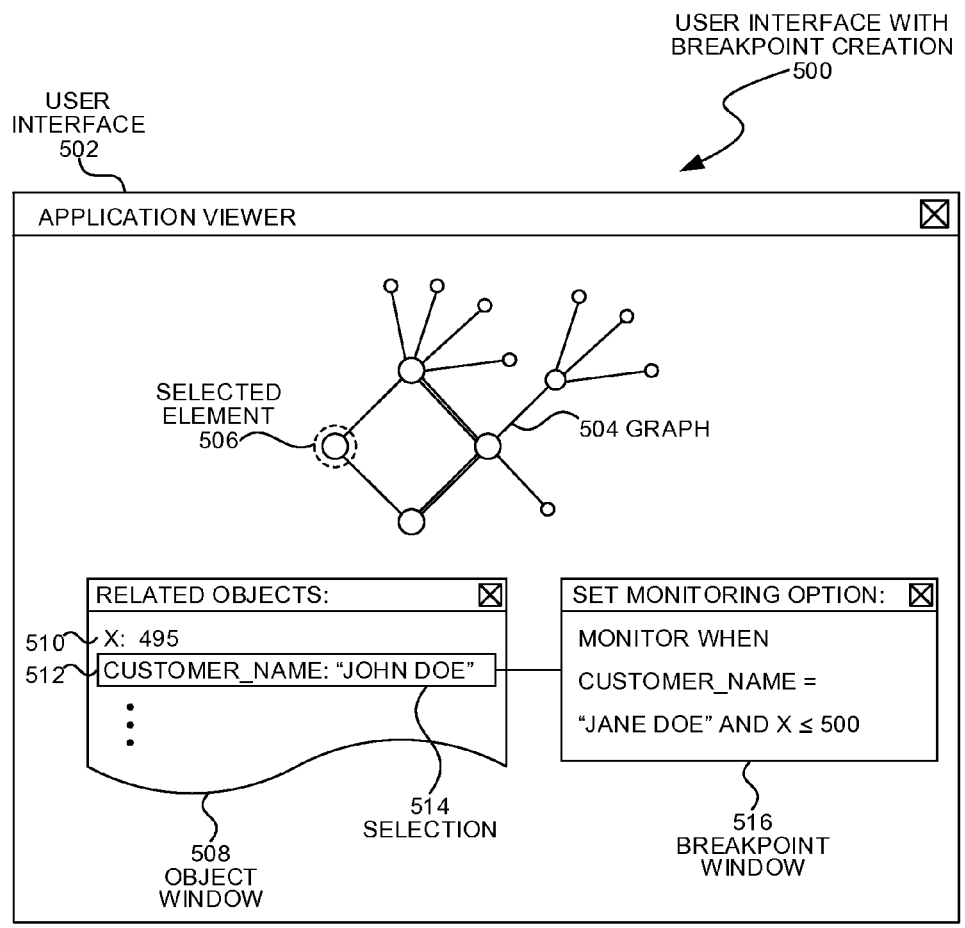
FIG. 5 is a diagram illustration of an embodiment showing an example user interface with a breakpoint creation.

FIG. 5 is a diagram illustration of an example embodiment 500 where a breakpoint may be created from a selection. Embodiment 500 illustrates an example user interface that may contain a list of objects associated with a selected element from a graph. From the list of objects, a breakpoint may be created and launched.

The example of embodiment 500 may be merely one example of a user interface through which a breakpoint may be set. Other embodiments may use many different user interface components to display information about objects related to a selection and to define and deploy a breakpoint. The example of embodiment 500 is merely one such embodiment.

A user interface 502 may contain a graph 504 that may have interactive elements. The graph 504 may represent an application with nodes representing code elements and edges representing relationships between the code elements. The graph 504 may be displayed with interactive elements such that a user may be able to select a node or edge and interact with source code, data objects, or other elements related to the selected element.

Node 506 is illustrated as being selected. In many cases, a highlighted visual effect may indicate that the node 506 is selected. Such a visual effect may be a visual halo, different color or size, animated blinking or movement, or some other effect.

An object window 508 may be presented in response to the selection of node 506. The object window may include various objects related to the node, and in the example of embodiment 500, those objects may be object 510, which may be a variable X with a value of 495, and an object 512 "customer_name" with a value of "John Doe".

In the example of embodiment 500, the object 512 is a selected object 514. Based on the selected object 514, a breakpoint window 516 may be presented. The breakpoint window 516 may include a user interface where a user may create an expression that defines a breakpoint condition. Once defined, the breakpoint may be stored and the execution may continue. When the breakpoint is satisfied, the execution may pause and allow the user to explore the state of the application at that point.

In a typical deployment, a user may select object 512 and may be presented with a menu. The menu may be a drop down menu or pop up menu that may include options for browsing object values, viewing source code, setting breakpoints, or other options.

Figure 6:
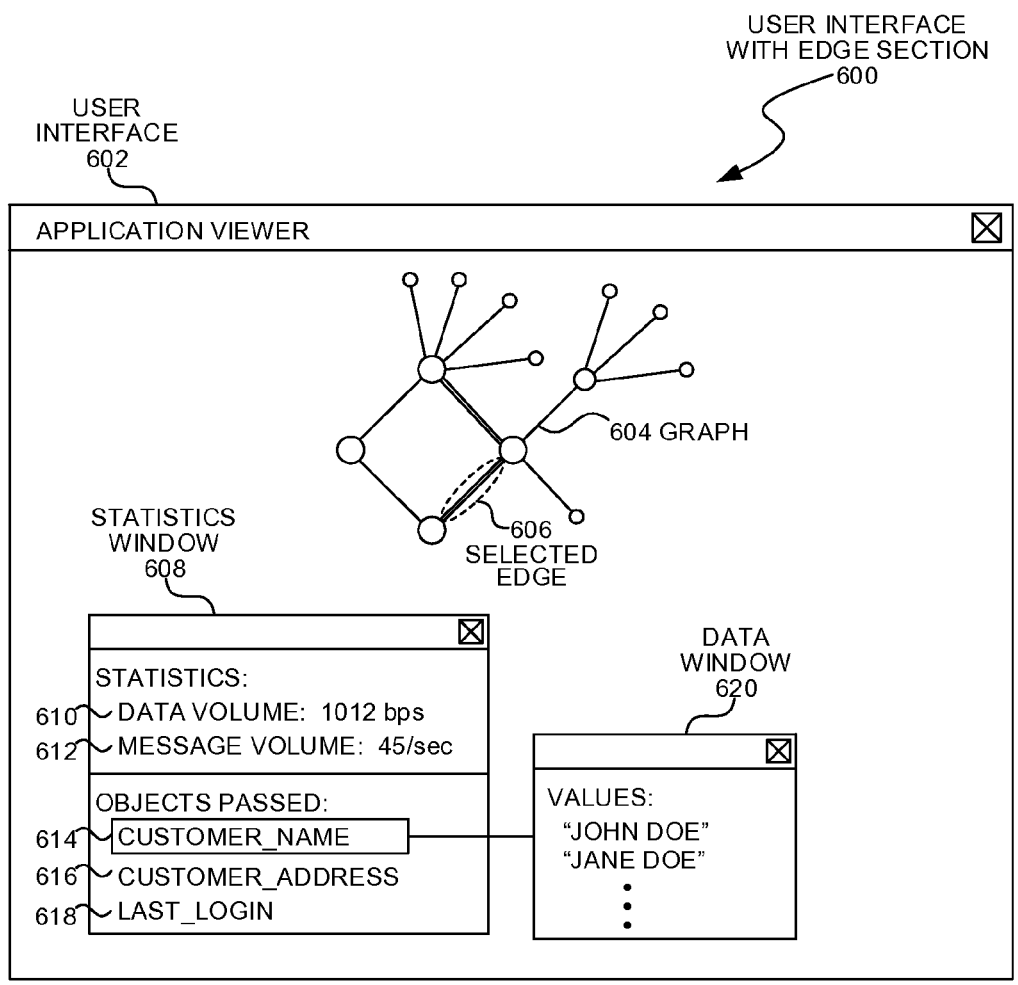
FIG. 6 is a diagram illustration of an embodiment showing an example user interface with an edge selection.

FIG. 6 is a diagram illustration of an example embodiment 600 where objects may be explored by selecting an edge on a graph representing an application. Embodiment 600 is merely one example of a user interface 602 where a user may select an edge and interact with objects relating to the edge.

The graph 604 may represent an application, where each node may represent a code element and the edges may represent relationships between the code elements. The relationships may be any type of relationship, including observed relationships such as function calls, shared memory objects, or other relationships that may be inferred or expressed from tracer data. In other cases, the relationships may include relationships that may be derived from static code analysis, such as control flow elements.

When an edge 606 is selected, a user may be presented with several options for how to interact with the edge 606. The options may include viewing data objects, viewing performance elements, setting breakpoints, viewing source code, and other options. In the example of embodiment 600, a statistics window 608 may show some observed statistics as well as objects or data associated with the relationship.

Two statistics 610 and 612 may be examples of observed performance data that may be presented. In the example of embodiment 600, the edge 606 may represent a relationship where messages and data may be passed between two code elements. The statistics 610 and 612 may show the data volume passed between the code elements as well as the message volume or number of messages passed.

The statistics window 608 may include a set of objects passed between the code elements. The objects 614, 616, and 618 may include "customer_name", "customer_address", and "last_login". By selecting object 614, a data window 620 may be presented that show the values of the parameter "customer_name". The values may be the data associated with "customer_name" that was passed along the relationship represented by edge 606.

Embodiment 600 is merely one example of the interaction that a user may have with a relationship in an interactive graph. Based on the selection of the relationship, a breakpoint may be created that pauses execution when a condition is fulfilled regarding the relationship. For example, a breakpoint condition may be set to trigger when any data are passed across the relationship, when the performance observations cross a specific threshold, or some other factor.

Figure 7:
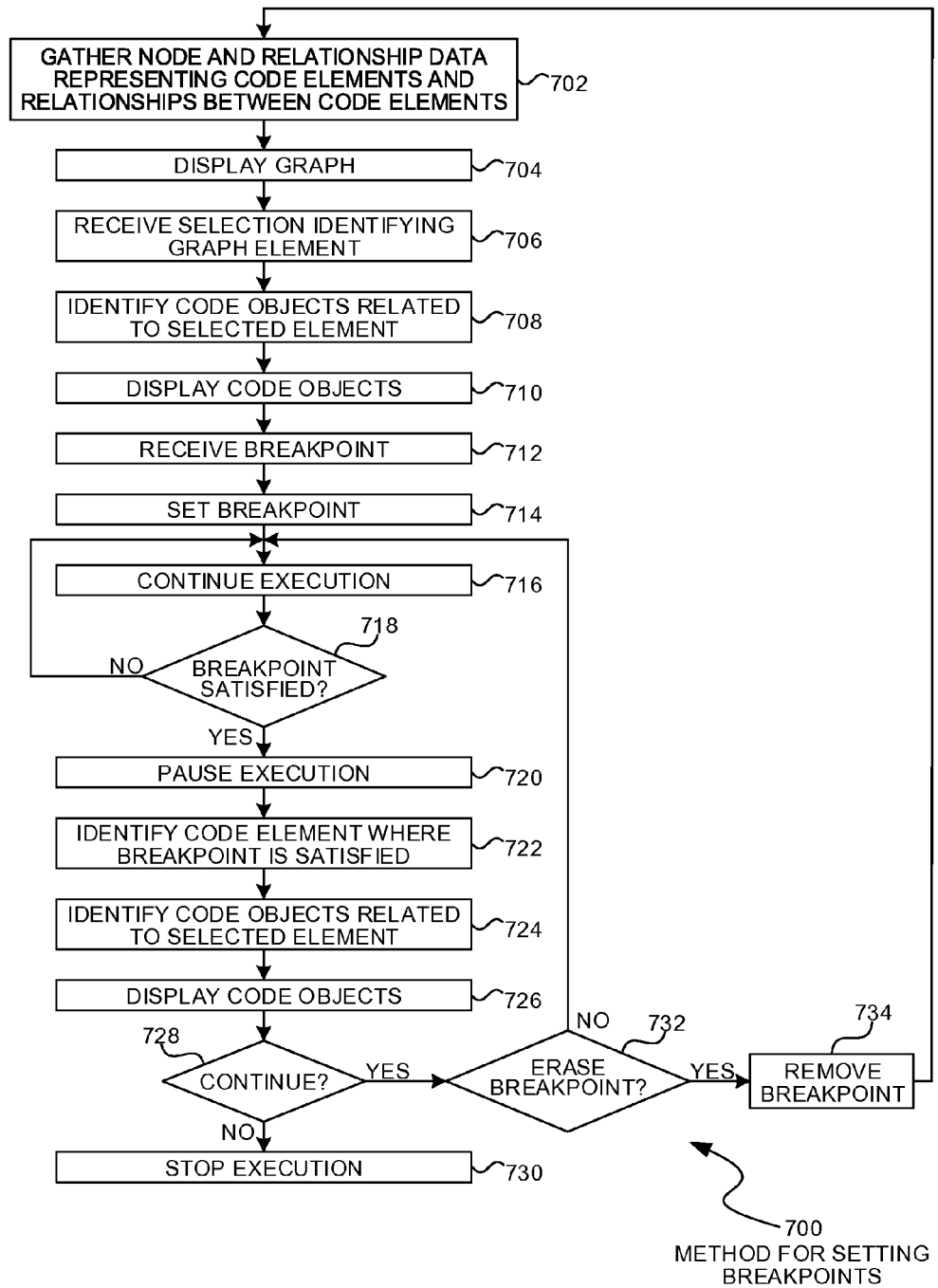
FIG. 7 is a flowchart illustration of an embodiment showing a method for setting and using breakpoints.

FIG. 7 is a flowchart illustration of an embodiment 700 showing a method for setting breakpoints from interactions with a graph that illustrates an application. Embodiment 700 may be an example of a breakpoint that may be created from the user interactions of selecting a node as in embodiment 500 or selecting an edge as in embodiment 600 for a graph that illustrates an application.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

In block 702, graph data may be collected that represents code elements and relationships between code elements. In some embodiments, the graph data may include all code elements and all known relationships for a given application. In other embodiments, the graph data may include recently used code elements and relationships, which may be a subset of the complete corpus of code elements and relationships.

A graph may be displayed in block 704. In many cases, the graph may have various interactive elements, where a user may be able to select and interact with a node, edge, groups of nodes or edges, or other elements. In some cases, the user may be able to pick specific elements directly from the graph, such as with a cursor or touchscreen interface. Such a selection may be received in block 706. The selection may be a node or edge on the graph.

A code object related to the selected element may be identified in block 708. The code object may be any memory object, code element, data, metadata, performance metric, or other item that may be associated with the code element.

When a node may be selected in block 706, objects relating to the corresponding code element may be identified. Such objects may include the source code, memory objects and other data accessed by the code element, as well as performance observations, such as time spent processing, memory usage, CPU usage, garbage collection performed, cache misses, or other observations.

When an edge may be selected in block 706, the objects relating to the corresponding relationship may be identified. Such objects may include the parameters and protocols passed across the relationship, the data values of those parameters, as well as performance observations which may include number of communications across the relationship, data values passed, amount of data passed, and other observations.

When an edge may be selected in block 706, some embodiments may include objects related to the sending and receiving code elements for a selected relationship. In such embodiments, the objects retrieved may include all of the objects related to the relationship as well as all of the objects related to both code elements within the relationship. Some such embodiments may filter the objects when displaying the objects such that only a subset of objects are displayed.

The identified objects or a subset of the identified objects may be displayed in block 710.

A breakpoint may be received in block 712. In many cases, a user interface may assist a user in creating a breakpoint using one or more of the objects identified in block 708. Such a user interface may include selection mechanisms where a user may be able to pick an object and set a parameter threshold or some other expression relating to the object, and then the expression may be set as a breakpoint. In some embodiments, a user interface may allow a user to create a complex expression that may reference one or more of the various objects to set as a breakpoint.

The breakpoint may be set in block 714. In many embodiments, setting a breakpoint may involve transmitting the breakpoint condition to a tracer or other component, where the component may monitor the execution and evaluate the breakpoint condition to determine when to pause execution. In some embodiments, the monitoring component may be part of an execution environment.

By setting a breakpoint, execution may continue in block 716 until a breakpoint may be satisfied in block 718. Once the breakpoint is satisfied in block 718, execution may be paused in block 720.

The term satisfying the breakpoint in block 718 may be any mechanism by which the breakpoint conditions may be met. In some cases, the breakpoint may be defined in a negative manner, such that execution may continue so long as the breakpoint condition is not met. In other cases, the breakpoint may be defined in a positive manner, such that execution may continue as long as the breakpoint condition is met.

Once the execution has paused in block 720, the code element in which the breakpoint was satisfied may be identified in block 722. In some cases, a breakpoint may be set by interacting with one node or edge representing one code element or a pair of code elements, and a breakpoint may be satisfied by a third code element. The code objects related to the code element in which the breakpoint was satisfied may be identified in block 724 and displayed in block 726.

Once the objects are displayed, a user may interact with the objects to inspect and query the objects while the application is in a paused state. Once such examination has been completed, the user may elect to continue execution in block 728. The user may elect to continue execution with the same breakpoint in block 732 and the process may loop back to block 716 after resetting the breakpoint. The user may also elect to remove the breakpoint in block 732, and the breakpoint may be removed in block 734 and loop back to block 702. In block 728, the user may also elect not to continue, where the execution may stop in block 730.

Figure 8A:
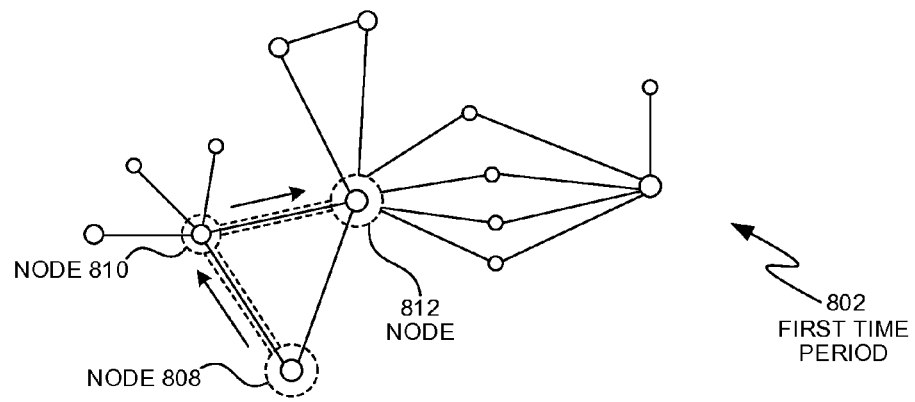
FIGS. 8A, 8B, and 8C are diagram illustrations of an example embodiment showing a progression of highlighting placed on a graph representing an application.
Figure 8B:
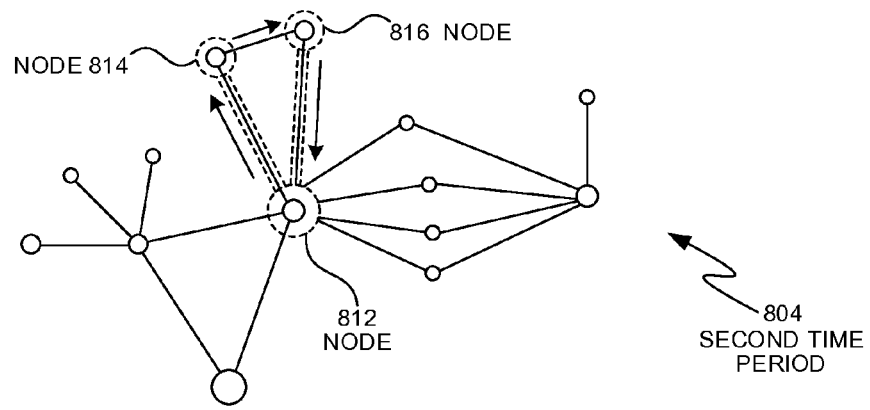
Figure 8C:
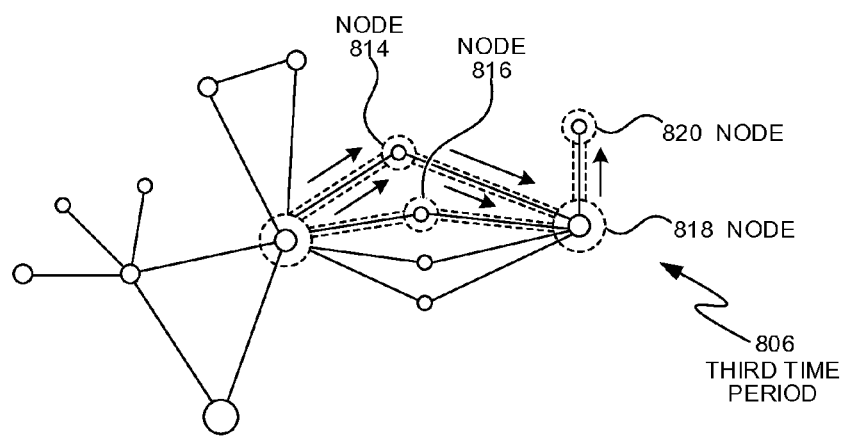

FIGS. 8A, 8B, and 8C are diagram illustrations of a graph at a first time period 802, a second time period 804, and a third time period 806, respectively. The sequence of time periods 802, 804, and 806 represent the progression of a highlighted code object that may traverse a graph. Each step in the sequence of illustrated time periods 802, 804, and 806 may represent multiple time steps and sequences, and the illustration of time periods 802, 804, and 806 are selected to display certain sequences in abbreviated form.

An object may be highlighted as the object or related objects traverse through the graph. An object may be a memory object that may be passed from one code element to another. In some cases, the code element may be transformed at each code element and emitted as a different object.

In another embodiment, the object may be a processing pointer or execution pointer and the highlighting may illustrate a sequence of code elements that may be executed as part of the application.

The sequence of execution may be presented on a graph by highlighting code elements in sequence. In some cases, the relationships on a graph may also be highlighted. Some embodiments may use animation to show the execution flow using movement of highlights or objects traversing the graph in sequence.

Some embodiments may show directional movement of an object across the graph using arrows, arrowheads, or other directional indicators. One such directional indicator may illustrate an object, such as a circle or other shape that may traverse from one code element to another in animated form.

The highlighting may allow a user to examine how the object interacts with each code element. In some embodiments, the progression of an object through the graph may be performed on a step by step basis, where the advancement of an object may be paused at each relationship so that the user may be able to interact with the nodes and edges to examine various data objects.

The traversal of an object through the graph may be shown in real time in some embodiments, depending on the application. In some cases, the application may process objects so quickly that the human eye may not be capable of seeing the traversal or the graph may not be updated fast enough. In such cases, the traversal of the object through the graph may be shown at a slower playback speed. In some such cases, the playback may be performed using historical or stored data which may or may not be gathered in real time.

At the first time period 802, an object may start at node 808 and traverse to node 810 and then to node 812. Such a traversal may reflect the condition where an object was processed at node 808, then the object or its effects were processed by nodes 810 and 812 in sequence.

In some embodiments, the starting object may change, be transformed, or otherwise produce downstream effects. In such cases, the output of a code element may be tracked and illustrated as highlighted elements on the graph. For example, an incoming request may include a data element that may be processed by several code elements. The data element may change and the processing may cause other code elements to begin processing. Such changes or effects may be identified and highlighted on the graph as an aftereffect of the original object being monitored.

In some embodiments, the highlighting in the sequence of graphs may reflect the location or operations performed on a specific memory object. In such embodiments, the code element that may consume the memory object may be highlighted as the memory object traverses the application.

In the second time period 804, the sequence of execution or processing may go from node 812 to node 814 to node 816 and back to node 812. The sequence illustrated in period 804 may reflect a loop of execution control. In some cases, the loop may be performed many times while following an object.

In the third time period 806, the sequence of execution may go from node 812 to nodes 814 and 816 in parallel, then to node 818 and 820 in series. The example of time period 806 may illustrate where a single object being tracked at node 812 may cause two or more code elements to be executed in parallel. The parallel operations may then converge in node 818.

Figure 9:
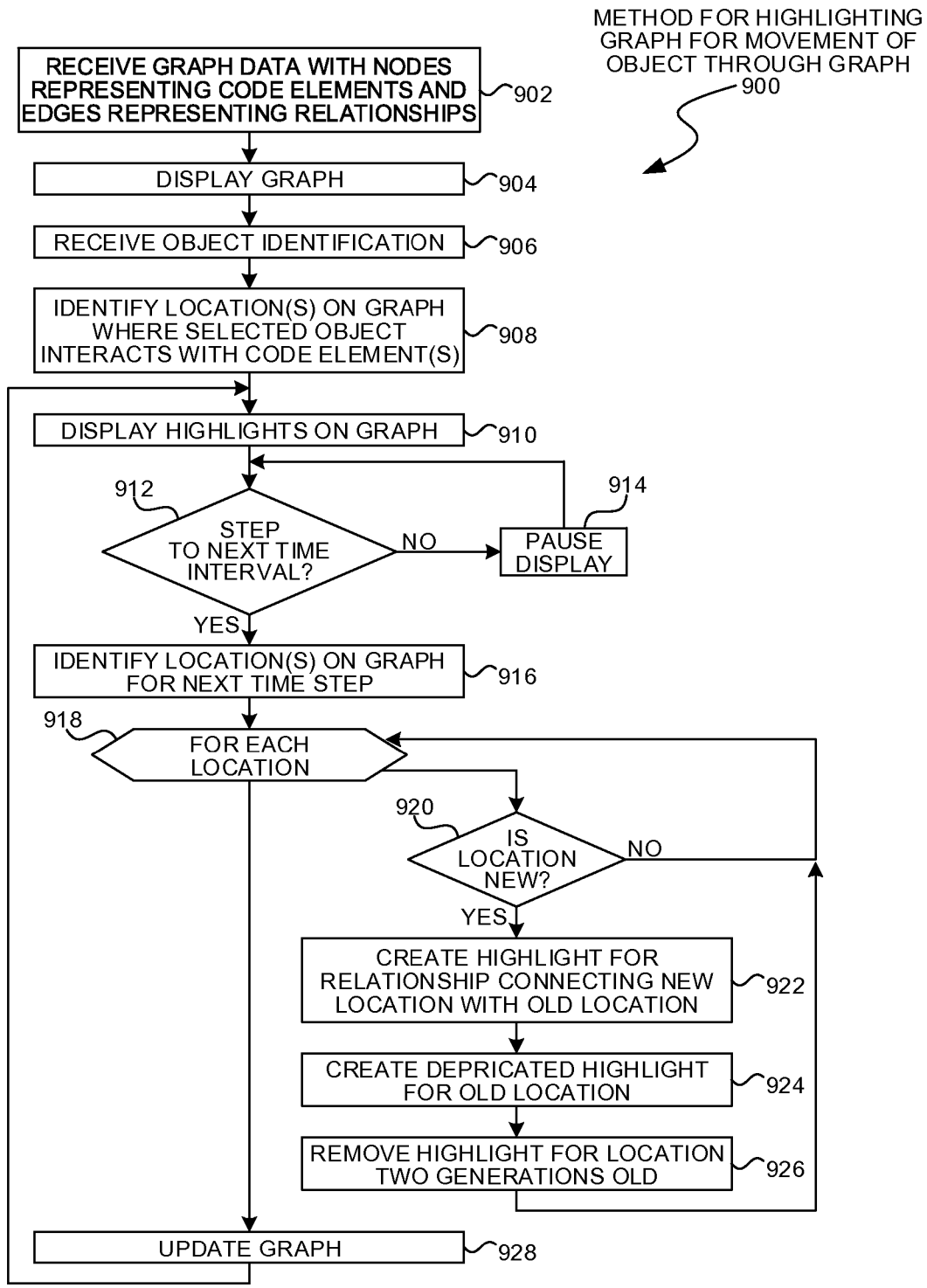
FIG. 9 is a flowchart illustration of an embodiment showing a method for highlighting a graph to trace an object's traversal across a graph.

FIG. 9 is a flowchart illustration of an embodiment 900 showing a method for highlighting a graph for movement of an object through a graph. The operations of embodiment 900 may produce highlights across a graph such as those illustrated in the time periods 802, 804, and 806.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 900 may illustrate a method for displaying highlights on a graph, where the highlights may represent an object and its effects that may flow through an application. In some cases, embodiment 900 may be presented using live data, which may be gathered and displayed in real time or near real time. In other cases, embodiment 900 may be presented using stored or historical data that may be gathered during one time period and replayed at a later time period.

When the displayed data may be real time or near real time data, the operations of an application may be slowed down for viewing. In some cases, each step of a sequence that may update the graph may be paused to allow a user to visualize the transition from a previous state. Such an embodiment may pause the sequence at each step and continue with a user input. Such an embodiment may continue with the user pressing 'return' or some other mechanism to advance the sequence. In some embodiments, the sequence may pause for a period of time, such as 0.25 seconds, 0.5 seconds, one second, two seconds, or some other time, then continue to the nest step in the sequence.

Graph data representing the code elements and relationships of the code elements of an application may be received in block 902. A graph may be displayed in block 904.

An object to be tracked may be received in block 906. In many embodiments, the object may be selected through a user interface. In some cases, the object may be selected by interacting with a graph and identifying an object through a user interface which may display one or more objects that may be tracked. In some cases, the object may be identified through a programmatic interface.

The location of the objects to be tracked may be identified in block 908. The location may refer to a node or edge on the graph. In some cases, a single object or tracking condition may result in multiple nodes or edges being highlighted.

The highlights may be displayed on the graph in block 910.

If an input to advance to the next time interval has not been received in block 912, the display may be paused in block 914 and the process may loop back to block 912. Once a condition to proceed to the next time interval has been met in block 912, the process may continue.

In block 916, the next locations for highlighting may be identified. In some cases, the next location may be a plurality of locations. One example of such a case may be a condition where multiple processes or threads may be launched as a result of processing a first code element.

For each location in block 918, if the location is not new in block 920, the process may loop back to block 918.

If the location is a new location in block 920, a highlight may be created in block 922 for the relationship connecting an old location to a new location. The highlight may have a directional indicator, such as a graduated color, arrow, arrowhead, moving animation, or some other indicator.

Embodiment 900 illustrates a method where an older location may have a deprecated highlight, which is created in block 924. The deprecated highlight may be less intense such that a user may be able to visualize the movement of an object or its effects from an old location to a new location. After one time step in a deprecated state, the highlight may be removed for a location two generations old in block 926.

After processing each new location in block 918, the graph may be updated with the changes to the highlighting in block 928. The process may return to block 910 to display the graph with highlights.

Figure 10:
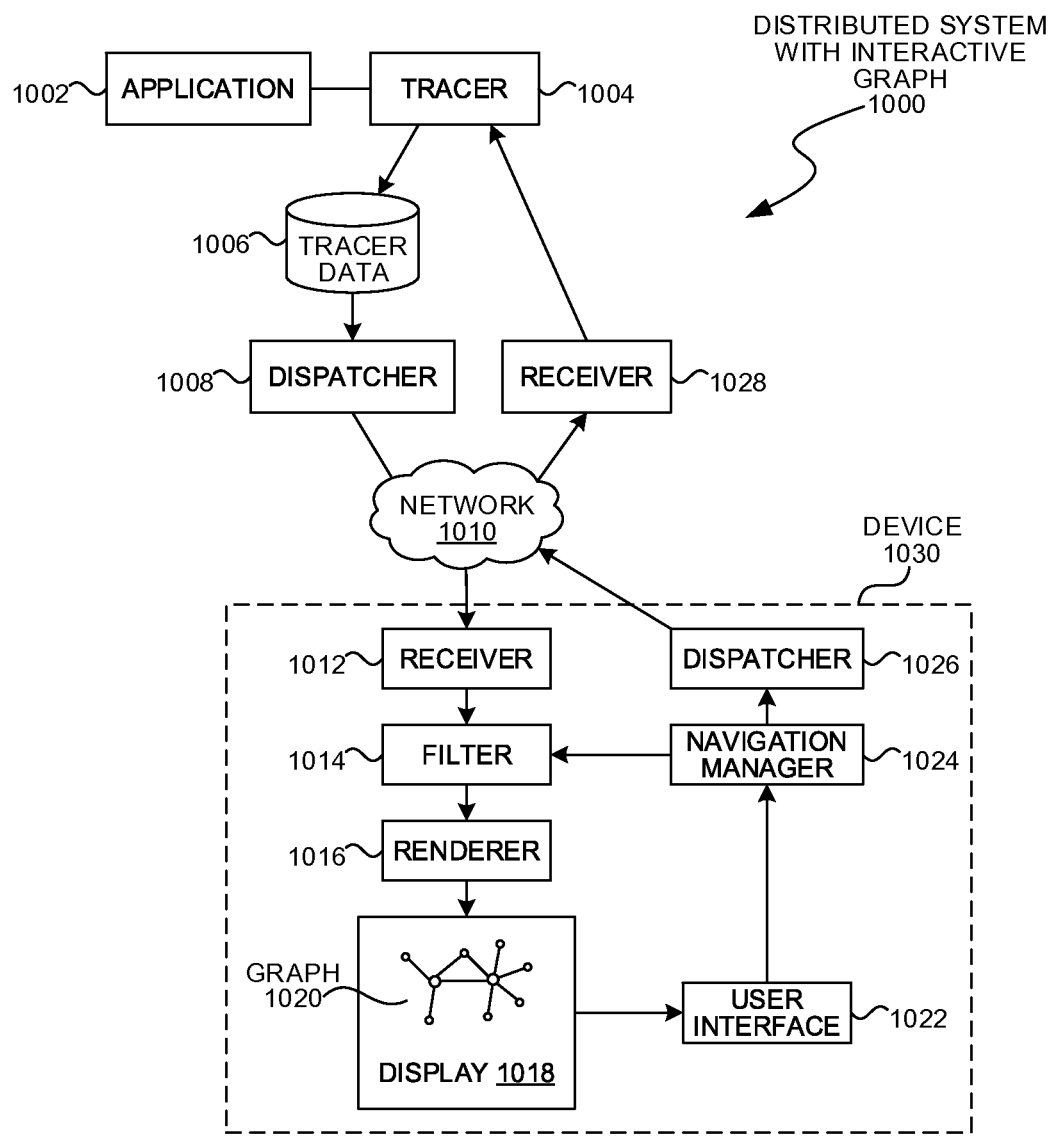
FIG. 10 is a diagram illustration of an embodiment showing a distributed system with an interactive graph and filters.

FIG. 10 is a diagram illustration of an embodiment 1000 showing a distributed system with an interactive graph. Embodiment 1000 is an example of the components that may be deployed to collect and display tracer data, and to use filter to modify the visual representation of the data.

Embodiment 1000 illustrates two different mechanisms for deploying filters that may change a displayed graph. In one mechanism, filters may be applied just prior to rendering a graph. In another mechanism, filters may be applied by a tracer to transform raw tracer data from which a graph may be rendered. Various embodiments may deploy one or both mechanisms for applying filters to the tracer data.

While an application 1002 executes, a tracer 1004 may collect tracer data 1006. The tracer data 1006 may identify code elements and relationships between the code elements.

A dispatcher 1008 may transmit the tracer data across a network 1010 to a device 1030. The device 1030 may be a standalone computer or other device with the processing capabilities to render and display a graph, along with user interface components to manipulate the graph.

The device 1030 may have a receiver 1012 that may receive the tracer data 1006. A filter 1014 may transform the data prior to a renderer 1016 which may generate a graph 1020 that may be shown on a display 1018.

A user interface 1022 may collect input from a user from which a navigation manager 1024 may create, modify, and deploy filters 1014. The filters may cause the tracer data 1006 to be rendered using different groupings, transformations, or other manipulations.

In some cases, the navigation manager 1024 may cause certain filters to be applied by the tracer 1004. The navigation manager 1024 may receive input that may change how the tracer 1004 collects data, then create a filter that may express such changes. The filters may include adding or removing data elements in the tracer data 1006, increasing or decreasing tracer frequency, causing the tracer 1004 to perform data manipulations and transformations, or other changes.

Some filters may be transmitted by a dispatcher 1026 across the network 1010 to a receiver 1028, which may pass the changes to the tracer 1004. The filters may be applied at the tracer 1004 to change the tracer data 1006 for subsequent tracing operations. The effects of such transformations may be subsequently viewed on the graph 1020.

Figure 11A:
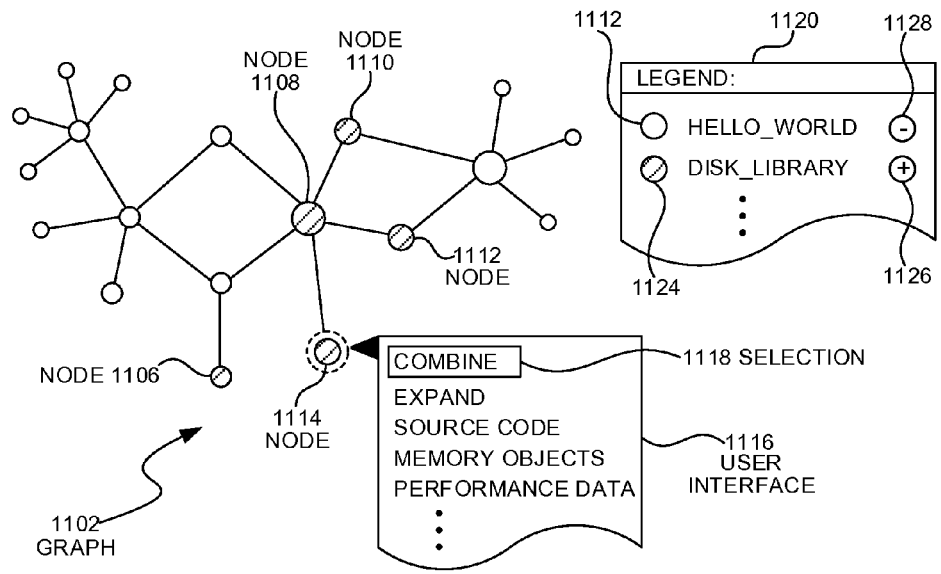
FIGS. 11A and 11B are diagram illustrations of an example embodiment showing a sequence of applying a filter to a graph.
Figure 11B:
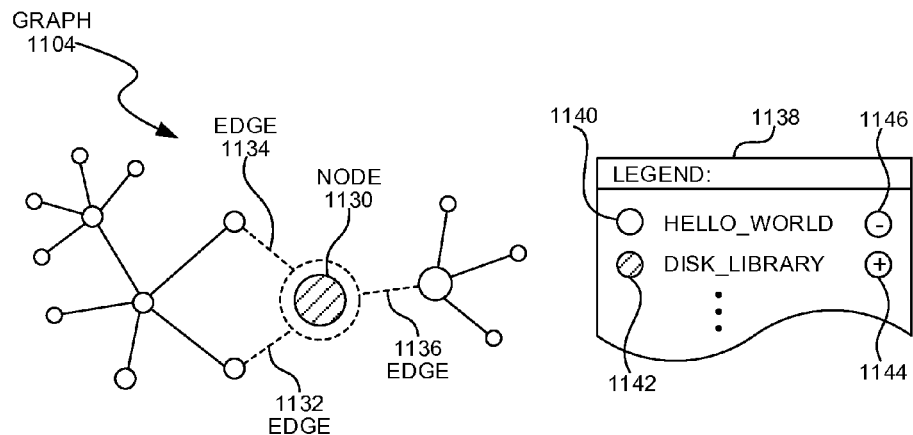

FIGS. 11A and 11B are diagram illustrations of user interfaces showing graphs 1102 and 1104, respectively. The sequence of graphs 1102 and 1104 illustrate a user experience where a filter may be applied to combine a group of graph elements into a single node.

The graph 1102 represents an application with two groups of code elements. One group of code elements may be members of "hello_world", while other code elements may be members of "disk_library". Nodes 1106, 1108, 1110, 1112, and 1114 are illustrated as being members of "disk_library", and each node are illustrated as shaded to represent their group membership.

Node 1114 is illustrated as being selected and may have a halo or other visual highlighting applied. When node 1114 is selected, a user interface 1116 may be presented to the user.

The user interface 1116 may include many different filters, transformations, or other operations that may be performed. In many cases, such operations may use the selected node 1114 as an input to a selected operation. In the example of graph 1102, options may include combining nodes together, expanding the selected node into multiple nodes, viewing source code, displaying memory objects, and displaying performance data. These options are mere examples which may or may not be included on various embodiments. In some cases, additional operations may be present.

In the example of graph 1102, a selection 1118 may indicate that the user selects to combine nodes similar to the selected node 1114.

In graph 1104, the nodes 1106, 1108, 1110, 1112, and 1114 are illustrated as combined into node 1130. Graph 1104 illustrates the results of applying a combination filter to the data of graph 1102, where the combination filter combines all similar nodes into a single node.

Another user interface mechanism may be a legend 1120, which may show groups 1122 and 1124 as the "hello_world" and "disk_library" groups. The shading of the groups shown in the legend may correspond to the shading applied to the various nodes in the graph.

The legend 1120 may operate as a user interface mechanism by making combine and expand operations available through icons 1126 and 1128. Such icons may be toggled to switch between combined and expanded modes.

When the "disk_library" group of nodes are combined in graph 1104, the edges connecting various nodes to the combined node 1130 may be highlighted. In the example of graph 1104, edges 1132, 1134, and 1136 may be illustrated as dashed or have some other visual differentiation over other edges. Such highlighting may indicate that one, two, or more relationships may be represented by the highlighted edges.

The legend 1138 may illustrate groups 1140 and 1142 with icons 1144 and 1146. The icon 1144 may illustrate that the group is illustrated as combined, and may be toggled to change back to the graph 1102.

Figure 12:
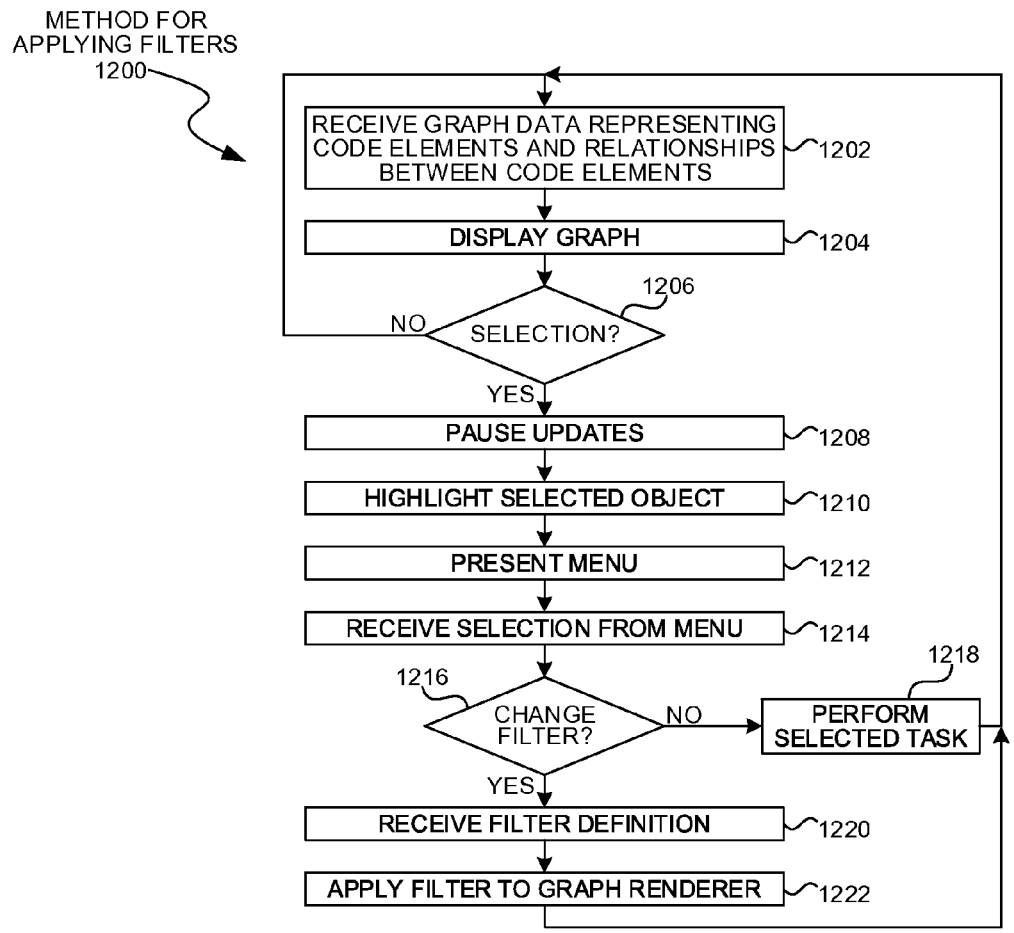
FIG. 12 is a flowchart illustration of an embodiment showing a method for creating and applying filters to a graph.

FIG. 12 is a flowchart illustration of an embodiment 1200 showing a method for creating and applying filters to a displayed graph. Embodiment 1200 may illustrate one method that may accomplish the transformation illustrated in FIGS. 11A and 11B, as well as one method performed by the components of embodiment 1000.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Graph data representing code elements and relationships between code elements may be received in block 1202 and a graph may be displayed from the data in block 1204. When no selection may be made to the graph in block 1206, the process may loop back to block 1202 to display updated graph data. In the example of embodiment 1200, the graph may reflect real time or near real time updates which may be collected from a tracer.

When a selection may be made in block 1206, the updates may pause in block 1208. The selected object may be highlighted in block 1210 and a menu may be presented in block 1212. A user may select an operation from the menu in block 1214. If the operation does not change a filter in block 1216, the operation may be performed in block 1218. In previous examples, some of the operations may include displaying source code for a selected element, displaying performance data related to the selected element, setting a breakpoint, or some other operation.

When the selection is a change to a filter in block 1216, the filter definition may be received in block 1220. The filter definition may be a predefined change to a filter which may be merely selected by a user. In some cases, a user may enter data, create expressions, or provide some other filter definition.

The filter may be applied to a graph renderer in block 1222 and the process may loop back to block 1202. In some cases, the filter may be transmitted to a tracer or other data source so that the effects of the filter may be viewed on the graph in block 1204.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method for animating traversal of an object through a graph that visually illustrates an execution of an application, the method being implemented by one or more processor of a computer system, said method comprising:
    receiving a selection of the object, the object being related to the application;
    examining trace data for said application to identify said object interacting with 1) a first code element in said application and 2) a second code element in said application, said first code element and said second code element being connected by a relationship in said application;
    generating graph data for rendering the graph, said graph comprising 1) nodes representing code elements of the application and 2) edges representing relationships between said code elements of the application, wherein the first code element has associated therewith a first node and a first edge and the second code element has associated therewith a second node and a second edge, and wherein a size of each node in the graph is based on an amount of processing time consumed by each node's corresponding code element such that the first node is displayed as being of a first size and the second node is displayed as being of a second size;
    displaying the graph;
    generating a first highlight at a first location on the graph where the object is interacting with the first code element;
    at a first time, displaying the first highlight on said graph, the first highlight corresponding to the first location of the object at a first time period in a plurality of sequential time periods of the object traversing through the graph, the first highlight comprising a highlighting of the first node or the first edge;
    generating a second highlight at a second location on the graph where the object is interacting with the second code element;
    at a second time, displaying the second highlight on said graph, the second highlight corresponding to the second location of the object at a second time period in the plurality of sequential time periods of the object traversing through the graph, the second highlight comprising a highlighting of the second node or the second edge; and
    reducing or removing the first highlight of the first node or the first edge during a display of the second highlight of the second node or the second edge,
    whereby traversal of the object from the first code element to the second code element during the execution of the application is reflected by displaying a transitioning of the first highlight to the second highlight on the graph.

2. The method of claim 1 further comprising:
    generating a third highlight for a third time period in the plurality of sequential time periods of the object traversing through the graph and execution of a third code element of the application, the third highlight comprising a highlighting of a third node or a third edge; and
    reducing the second highlight of the second node or the second edge.

3. The method of claim 1, wherein the first highlight or the second highlight includes a visual indication of directionality.

4. The method of claim 3, said visual indication of directionality comprising an arrowhead.

5. The method of claim 3, said visual indication of directionality comprising an animation.

6. The method of claim 1, wherein the method includes transitioning from the first time to the second time and from the first highlight to the second highlight automatically.

7. The method of claim 6, wherein the method includes pausing between the transitioning from the first time to the second time and from the first highlight to the second highlight for a predetermined period of time.

8. The method of claim 1, wherein the method includes pausing between the transitioning from the first time to the second time and from the first highlight to the second highlight until user input is received after a pause is initiated.

9. A computing system comprising:
    a processor; and
    one or more storage device having stored thereon computer-executable instructions that are executable by the processor to cause the computing system to animate traversal of an object through a graph that visually illustrates an execution of an application by causing the computing system to:
    receive a selection of the object, the object being related to the application;
    examine trace data for said application to identify said object interacting with 1) a first code element in said application and 2) a second code element in said application, said first code element and said second code element being connected by a relationship in said application;
    generate graph data for rendering the graph, said graph comprising 1) nodes representing code elements of the application and 2) edges representing relationships between said code elements of the application, wherein the first code element has associated therewith a first node and a first edge and the second code element has associated therewith a second node and a second edge, and wherein a size of each node in the graph is based on an amount of processing time consumed by each node's corresponding code element such that the first node is displayed as being of a first size and the second node is displayed as being of a second size;
    display the graph;
    generate a first highlight at a first location on the graph where the object is interacting with the first code element;
    at a first time, display the first highlight on said graph, the first highlight corresponding to the first location of the object at a first time period in a plurality of sequential time periods of the object traversing through the graph, the first highlight comprising a highlighting of the first node or the first edge;

generate a second highlight at a second location on the graph where the object is interacting with the second code element;

at a second time, display the second highlight on said graph, the second highlight corresponding to the second location of the object at a second time period in the plurality of sequential time periods of the object traversing through the graph, the second highlight comprising a highlighting of the second node or the second edge; and reduce or remove the first highlight of the first node or the first edge during a display of the second highlight of the second node or the second edge, whereby traversal of the object from the first code element to the second code element during the execution of the application is reflected by displaying a transitioning of the first highlight to the second highlight on the graph.

10. The computing system of claim 9, wherein execution of the stored computer-executable instructions further cause the computer system to:

generate a third highlight for a third time period in the plurality of sequential time periods of the object traversing through the graph and execution of a third code element of the application, the third highlight comprising a highlighting of a third node or a third edge; and reduce the second highlight of the second node or the second edge.

11. The computing system of claim 10, wherein the first highlight further includes displaying an arrow showing a direction of processing, the arrow being displayed next to a highlighted edge from a first set of one or more edges.

12. The computing system of claim 11, wherein the arrow is removed when the first highlight is removed.

13. The computing system of claim 12, wherein the first highlight comprises coloring or intensity of light applied to the first set of the one or more edges.

14. The computing system of claim 9, wherein the first highlight or the second highlight includes a visual indication of directionality.

15. The computing system of claim 14, said visual indication of directionality comprising an arrowhead.

16. The computing system of claim 14, said visual indication of directionality comprising an animation.

17. The computing system of claim 9, wherein the transitioning from the first time to the second time and from the first highlight to the second highlight occurs automatically.

18. The computing system of claim 17, wherein the transitioning includes temporarily pausing during the transitioning from the first time to the second time and from the first highlight to the second highlight.

19. The computing system of claim 9, wherein execution of the stored computer-executable instructions further cause the computer processor to pause between the transitioning from the first time to the second time and from the first highlight to the second highlight until user input is received after a particular pause is initiated.

20. The computer system of claim 9, wherein execution of the computer-executable instructions further cause the computer system to:

receive a selection of the first node;

simultaneously display a code editing window with at least a portion of the graph, the code editing window including source code that represents a portion of the application represented by the first node; and cause a first line of the displayed source code to be highlighted, the highlighting occurring in response to the first node being selected.

21. One or more hardware storage device having stored thereon computer-executable instructions that are executable by a processor of a computer system to cause the computer system to animate a traversal of an object through a graph that visually illustrates an execution of an application by causing the computer system to:

receive a selection of the object, the object being related to the application;

examine trace data for said application to identify said object interacting with 1) a first code element in said application and 2) a second code element in said application, said first code element and said second code element being connected by a relationship in said application;

generate graph data for rendering the graph, said graph comprising 1) nodes representing code elements of the application and 2) edges representing relationships between said code elements of the application, wherein the first code element has associated therewith a first node and a first edge and the second code element has associated therewith a second node and a second edge, and wherein a size of each of each node in the graph is based on an amount of processing time consumed by each node's corresponding code element such that the first node is displayed as being of a first size and the second node is displayed as being of a second size;

display the graph;

generate a first highlight at a first location on the graph where the object is interacting with the first code element;

at a first time, display the first highlight on said graph, the first highlight corresponding to the first location of the object at a first time period in a plurality of sequential time periods of the object traversing through the graph, the first highlight comprising a highlighting of the first node or the first edge;

generate a second highlight at a second location on the graph where the object is interacting with the second code element;

at a second time, display the second highlight on said graph, the second highlight corresponding to the second location of the object at a second time period in the plurality of sequential time periods of the object traversing through the graph, the second highlight comprising a highlighting of the second node or the second edge; and reduce or remove the first highlight of the first node or the first edge during a display of the second highlight of the second node or the second edge, whereby traversal of the object from the first code element to the second code element during the execution of the application is reflected by displaying a transitioning of the first highlight to the second highlight on the graph.

22. The one or more hardware storage device of claim 21, wherein execution of stored computer-executable instructions further cause the computer system to:

generate a third highlight for a third time period in the plurality of sequential time periods of the object traversing through the graph and execution of a third code element of the application, the third highlight comprising a highlighting of a third node or a third edge; and reduce the second highlight of the second node or the second edge.

23. The one or more hardware storage device of claim 21, wherein the first highlight or the second highlight includes a visual indication of directionality comprising at least an arrowhead.

* * * * *